United States Patent
Lee

(10) Patent No.: US 9,942,480 B2
(45) Date of Patent: Apr. 10, 2018

(54) IMAGE PROCESSING APPARATUS AND METHOD

(71) Applicant: Samsung Electronics Co., Ltd., Suwon-si, Gyeonggi-do (KR)

(72) Inventor: Yonggu Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/877,317

(22) Filed: Oct. 7, 2015

(65) Prior Publication Data

US 2016/0028964 A1    Jan. 28, 2016

Related U.S. Application Data

(63) Continuation of application No. 13/873,858, filed on Apr. 30, 2013, now Pat. No. 9,185,302.

(30) Foreign Application Priority Data

May 3, 2012  (KR) ........................ 10-2012-0046617

(51) Int. Cl.
```
H04N 5/76      (2006.01)
H04N 5/228     (2006.01)
H04N 5/232     (2006.01)
```
(52) U.S. Cl.
CPC ......... *H04N 5/23293* (2013.01); *H04N 5/232* (2013.01); *H04N 5/23229* (2013.01); *H04N 5/23296* (2013.01)

(58) Field of Classification Search
CPC ............... H04N 5/232; H04N 5/23293; H04N 5/23229; H04N 5/23296
See application file for complete search history.

(56) References Cited

U.S. PATENT DOCUMENTS

| | | |
|---|---|---|
| 2003/0112340 A1 | 6/2003 | Okada et al. |
| 2005/0200744 A1 | 9/2005 | Kobayashi |
| 2007/0248341 A1 | 10/2007 | Larner et al. |
| 2008/0211941 A1* | 9/2008 | Deever ............... H04N 5/2258 348/262 |

(Continued)

FOREIGN PATENT DOCUMENTS

| | | |
|---|---|---|
| CN | 1413414 A | 4/2003 |
| CN | 101309365 A | 11/2008 |

(Continued)

*Primary Examiner* — Lin Ye
*Assistant Examiner* — John H Morehead, III
(74) *Attorney, Agent, or Firm* — Jefferson IP Law, LLP

(57) ABSTRACT

An image processing apparatus and method for regulating viewing image output of the image processor which processes motion and still images in a time divisional manner are provided. The image processing apparatus includes an image processor processing the viewing and still images in a time divisional manner, a timing manager storing the viewing image processed by the image processor temporarily and outputting the viewing image at a preset time of a frame period, and a controller controlling, in response to a capture request, the image processor to process the still image at a residual part of a current frame to be at a beginning part of a next frame and to process the buffered viewing image to be at the residual part of the next frame, wherein the residual part of the next frame is a part which remains after processing the still image completely.

20 Claims, 16 Drawing Sheets

(56) References Cited

U.S. PATENT DOCUMENTS

| | | | |
|---|---|---|---|
| 2008/0284866 A1 | 11/2008 | Mizutani | |
| 2008/0309778 A1* | 12/2008 | Tabatabai | H04N 5/2258 348/222.1 |
| 2009/0160957 A1* | 6/2009 | Deng | H04N 5/23248 348/208.99 |
| 2010/0085439 A1* | 4/2010 | Lin | G03B 17/14 348/222.1 |
| 2010/0321530 A1* | 12/2010 | Baek | H04N 5/232 348/231.99 |
| 2011/0019936 A1* | 1/2011 | Bhrugumalla | H04N 5/232 382/298 |
| 2011/0109766 A1* | 5/2011 | Roh | H04N 5/232 348/223.1 |
| 2011/0122269 A1 | 5/2011 | Zhao et al. | |
| 2011/0261217 A1* | 10/2011 | Muukki | G06T 3/4015 348/222.1 |
| 2011/0261228 A1* | 10/2011 | Peng | H04N 1/2145 348/231.6 |
| 2012/0257071 A1* | 10/2012 | Prentice | H04N 5/23238 348/220.1 |
| 2013/0208143 A1 | 8/2013 | Chou et al. | |
| 2013/0271621 A1* | 10/2013 | Lee | H04N 5/225 348/222.1 |
| 2013/0286250 A1* | 10/2013 | Kumar | H04N 5/232 348/231.99 |
| 2014/0036108 A1* | 2/2014 | Yoon | H04N 5/23293 348/231.99 |
| 2014/0111670 A1* | 4/2014 | Lord | H04N 5/23206 348/240.99 |
| 2016/0028964 A1* | 1/2016 | Lee | H04N 5/232 348/333.01 |

FOREIGN PATENT DOCUMENTS

| | | |
|---|---|---|
| CN | 101616259 A | 12/2009 |
| CN | 101690163 A | 3/2010 |
| CN | 103248818 A | 8/2013 |
| KR | 2011-0051344 A | 5/2011 |

* cited by examiner

IMAGE PROCESSING APPARATUS AND METHOD

CROSS-REFERENCE TO RELATED APPLICATION(S)

This application is a continuation application of prior application Ser. No. 13/873,858, filed on Apr. 30, 2013, which claimed the benefit under 35 U.S.C. § 119(a) of a Korean patent application filed on May 3, 2012 in the Korean Intellectual Property Office and assigned Serial number 10-2012-0046617, the entire disclosure of each of which is hereby incorporated by reference.

BACKGROUND OF THE INVENTION

1. Field of the Invention

The present invention relates to an image processing apparatus and method of a camera. More particularly, the present invention relates to an apparatus and method for regulating viewing of an image output from an image processor which processes motion and still images in a time divisional manner.

2. Description of the Related Art

A camera device and camera-equipped electronic device are capable of processing high quality images and providing various user convenience functions. The related-art camera device is equipped with an image sensor or camera sensor capable of processing full High Definition (HD) or higher resolution images.

The camera device displays the image sensed by the camera sensor in a preview mode and saves the image acquired by the camera sensor in response to the push on a shutter button. A shutter delay or shutter lag between triggering the shutter and when the camera records a photograph may exist. For example, there is the time difference between when the user presses the shutter and when the image processor processes the photo completely, and this is referred to as a lag. The shutter delay or shutter lag is the reason why a user may not capture an intended shot.

Also, the related-art camera device is limited in processing the preview and still images simultaneously or the motion and still images simultaneously. In the case of processing motion and still images simultaneously, the limited processing capability of the image processor of the related-art camera device is likely to fail processing the still image to guarantee the motion image output at the output frame rate equal to the input frame rate.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for outputting the processed motion image at a predetermined frame rate in a camera device or camera-equipped electronic device. Here, the motion image can be a preview image and/or an on-recording motion image, and the preset time of a frame period can be a time delayed by as much as a predetermined duration from the frame end time or frame start time.

In the case of processing the still and motion images simultaneously, the image processor processes and buffers the motion image first, processes the still image subsequently, and then outputs the processed motion image at the time of a frame period. If a frame image for processing the still image is received in the next frame duration, then the image processor buffers the still image, then processes the motion image of the next frame after processing the still image, and then outputs the processed motion image at the preset time of the frame period.

In accordance with an aspect of the present invention, an image processing apparatus is provided. The apparatus includes an image processor including an image scaler scaling an image generated by a camera into a viewing image at every frame period, a viewing image buffer buffering the viewing image, and a still image buffer buffering the image generated by the camera as a still image, the image processor processing the viewing and still images in a time divisional manner, a timing manager storing the viewing image processed by the image processor temporarily and outputting the viewing image at a preset time of a frame period, and a controller controlling, in response to a capture request, the image processor to process the still image at a residual part of a current frame to be at a beginning part of a next frame and to process the buffered viewing image to be at the residual part of the next frame, wherein the residual part of the next frame is a part which remains after processing the still image completely.

In accordance with another aspect of the present invention, an image processing method is provided. The method includes processing an image generated by the camera at every frame period by converting the image from the camera to a still image and a viewing image, buffering the still and viewing images, and processing the buffered viewing image, storing the processed viewing image temporarily; and outputting the temporarily stored viewing image at a preset time of a frame period.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
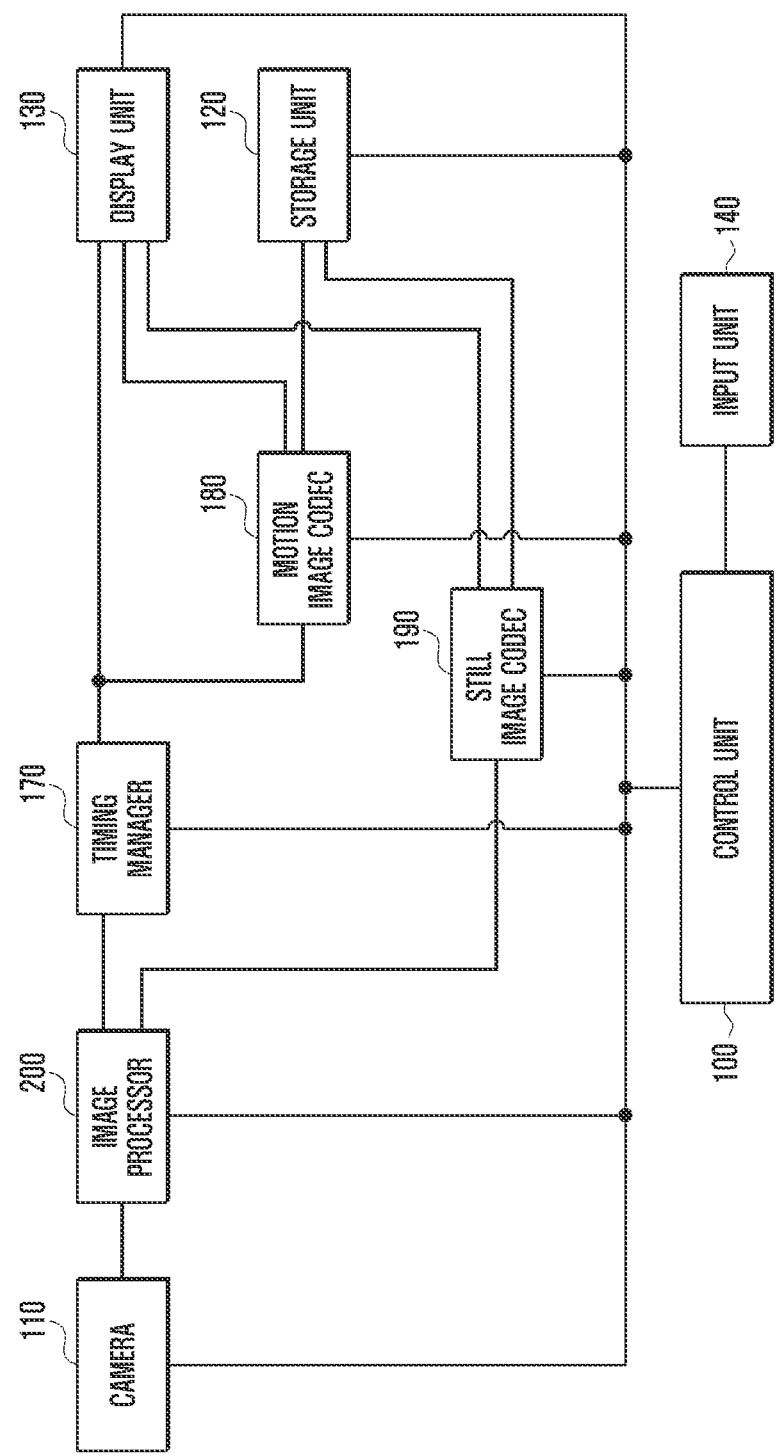
FIG. 1 is a block diagram illustrating a configuration of a camera device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An image processor of a camera device or a camera-equipped electronic device according to an exemplary embodiment of the present invention processes every frame image output by the camera in a camera operation mode, e.g., a preview mode to generate an image as preview or motion image, hereinafter, referred to as a motion image or a viewing image, and another image to be stored as a still image, hereinafter, referred to as a capture image. Here, the viewing image has a size equal to or less than that of the capture image. In this case, the camera device acquires an image from the camera at every frame and converts the acquired image to the viewing image being displayed on the display as preview image while buffering the camera's full resolution image to be stored as still image. If a capture request is input in this state, then the camera device selects a frame image at the time when the capture request is detected, which is a frame image with zero shutter lag, among the buffered frame images and encodes the selected frame image compressively, the encoded image being stored as the capture image.

Typically, the camera device has a shutter lag between when the user presses the shutter and when the camera captures the image. The camera device, according to an exemplary embodiment of the present invention, is provided with a buffer for storing the camera's full resolution images in separation with the viewing image and buffers the full resolution images while the camera is operating. The camera device selects and processes one of the buffered frame images at shooting request timing so as to achieve zero shutter lag. In an exemplary embodiment of the present invention, the buffer can be configured to store a predetermined number of frame images and large enough to compensate for the shutter lag in size. Typically, the shutter lag may be a time length of about 2 frames period. Accordingly, it is preferred to configure the buffering window to be less than 5 frames.

The image processor according to an exemplary embodiment of the present invention processes the viewing and still images in a time divisional manner. In the motion image processing mode, e.g., preview mode or motion image recording mode, the image processor establishes a motion image processing path. In the capture mode, the image processor establishes a viewing image processing path first to process the motion image and then a still image processing path to process the still image during the residual part of the frame. At this time, the still image can be acquired as a high pixel image with an advanced image sensor of the camera.

In the case that the camera outputs the high pixel image, the image processor may not process both the motion and still images in one frame period. In order to overcome this problem, the image processor according to an exemplary embodiment of the present invention buffers the viewing images processed in motion image processing mode and then outputs during a preset time of the frame period, e.g., a frame end or a time close to the frame end. This is to match the current viewing image output time to the previous frame viewing image output time even in the case that the still images in two consecutive frames are processed such that the viewing image of the next frame is processed after processing the still image. For example, the image processor, according to an exemplary embodiment of the present invention, processes, in the case of processing both the motion and still images simultaneously, the motion image first in the frame period, the still image during the residual part of the frame and at the beginning of the next frame continuously, and then the motion image in the residual part of the next frame period.

For example, the image processor, according to an exemplary embodiment of the present invention, processes, in the frame period in which the motion and still images have to be processed, the motion image first at the beginning of the frame, the still image at the residual part of the frame and the beginning part of the next frame, and the motion image at the residual part of the next frame after completion of processing the still image.

In the following description, a term 'full resolution image' denotes the image output by the camera in a state of being not scaled. A term 'viewing image' denotes the image displaying on the display unit in a preview mode or capable of being stored as a motion image in a state of being scaled to a predetermined size or resolution. The preview and the motion images derived from the viewing image may have the same size resolution. A term 'capture image' denotes the image capable of being stored as a still image and can be a camera's full resolution image or an image scaled to a predetermined size. In an exemplary embodiment of the present invention, the description is made under the assumption that the capture image is the camera's full resolution image.

A term 'image scaling' denotes adjusting the full resolution image to a predetermined size or resolution. In an exemplary embodiment of the present invention, image scaling can be implemented through resizing process and/or summing and averaging process. Here, resizing is a method for adjusting image size through decimation, interpolation, and/or crop. The summing and averaging process is the method for adjusting the number of pixels by rendering adjacent pixels into one pixel and may be followed by decimation, interpolation, and/or crop.

FIG. 1 is a block diagram illustrating a configuration of a camera device according to an exemplary embodiment of the present invention.

Referring to FIG. 1, a camera 110 takes an image by means of an internal sensor in a camera-driving mode. The camera 110 includes an optical unit (not shown), an image sensor (not shown), and a signal processor (not shown). The optical unit is driven by a Mecha-shutter (not shown), a motor (not shown), and an actuator (not shown) and, particularly, performs zooming and focusing operations with the actuator. The optical unit takes an image, and the image sensor converts the image taken by the optical unit to an electrical signal. Here, the image sensor can be a high resolution image sensor such as Complementary Metal Oxide Semiconductor (CMOS) or Charge Coupled Device (CCD) sensor. The image sensor may include a global shutter. The global shutter is capable of performing a function similar to that of the Mecha-shutter embedded in the sensor.

In an exemplary embodiment of the present invention, the image sensor can be a sensor capable of sensing Ultra High Definition (UHD) or higher resolution image. The image sensed by the image sensor is converted into a digital image by the signal processor. The data output by the camera 110 can be Bayer data, raw data, or any other similar and/or suitable type of data.

A control unit 100 controls overall operations of the camera device. Particularly in an exemplary embodiment of the present invention, the control unit 100 controls an image processor 200 to process the viewing and capture images in a time divisional manner. The control unit 100 controls the image processor 200 to processes the viewing image in the preview mode and the viewing image for display and the capture image for recording in the capture mode.

The image processor 200 converts the image taken by the camera 110 to a viewing image in the preview mode and in the motion image recording mode. The image processor 200 processes the viewing image at the beginning of the current frame period, the still image at the residual part of the current frame and the beginning of the next frame, and the viewing image of the next frame after the completion of the still image processing.

A timing manager 170 stores the viewing image processed by the image processor 200 temporarily and outputs the temporarily stored viewing image at the preset time of the frame period. The timing manager 170 is capable of outputting the viewing image at a preset time of every frame period. Here, the timing manager 170 can be a buffer, and the preset time of the frame period can be the frame end part or a part close to the frame end.

A still image codec 190 encodes and compresses the still image output by the image processor 200. And the compressed image is stored a storage unit 120. Here, the still image codec can be a JPEG codec. The viewing image can be used for storing a motion image. If a motion image shooting request is detected, a motion image codec 180 encodes the viewing images output by the image processor 200 into a motion image which is stored in the storage unit 120. Here, the motion image can be the same size as the viewing image. The viewing image may have a number of pixels greater than that of the preview image. In such a case, the image processor 200 may include a preview image scaler and a motion image scaler or a common image scaler capable of adjusting the scale ratio. If the motion image recording is requested, the control unit 100 controls the image processor 200 to scale the image to the size of the motion viewing image such that the image processor 200 scales the camera's full resolution image to the motion image size. The motion image encoding can be performed with various motion image codecs, such as an H.264 codec or any other similar and/or suitable codec.

The storage unit 120 is a memory for storing the still and motion images acquired by processing the images. A display unit 130 displays the viewing images output as adjusted in display time by the timing manager 170. The display unit 130 can be any Liquid Crystal Display (LCD), an Organic Light Emitting Diode (OLED) display or any other similar and/or suitable type of display device or unit. An input unit 140 is provided with a plurality of keys capable of generating commands for configuring and executing various functions of the camera device. Here, the keys of the input unit 140 can be provided outside of the camera device in the form of buttons and virtual keys presented on a touch panel included in the camera device. The display unit 130 and the input unit 140 can be integrated into a touchscreen.

The control unit 100 controls the operations of the camera device according to the control command input through the input unit 140. If a camera driving command is input through the input unit 140, the control unit 100 controls the camera 110 and the image processor 200 to operate in the preview mode. If a capture request is input through the input unit 140, the control units selects the full resolution image taken at the time when the capture request is input from a still image buffer 250 and controls a multiplexer 270 and a demultiplexer 280 (see FIGS. 3A and 3B) in a time divisional manner such that the viewing image is displayed on the screen of the display unit 130 while the selected full resolution image is encoded to be stored in the storage unit 120. In the preview mode or motion image recording mode, the control unit 100 controls the image processor 200 to process the viewing image, the processed viewing image being stored in the timing manager 170 temporarily. Afterward, the control unit controls the timing manager 170 to output the temporarily stored viewing image in the preset time of the corresponding frame period. In the capture mode, the control unit 100 controls the image processor 200 to process the viewing image at the beginning part of the current frame and store the processed viewing image in the timing manager 170 temporarily and controls the image processor 200 to processes the still image at the residual part of the current frame and at the beginning part of the next frame continuously. Once the still image processing has completed, the control unit 100 controls the image processor 200 to process the viewing image of the next frame, the processed viewing image being stored in the timing manager 170 temporarily, and controls the timing manager 170 to output the viewing image at the preset time of the frame period.

The image processor according to an exemplary embodiment of the present invention controls to display the viewing image at a preset time of every frame period, e.g., at the end part and a part close to the end of the frame period so as to regulate the display operation even when the still image processing time elongates.

FIGS. 2A, 2B, 3A, and 3B are block diagrams illustrating configurations of an image processor, such as the image processor of FIG. 1, according to an exemplary embodiment of the present invention.

Figure 2A:
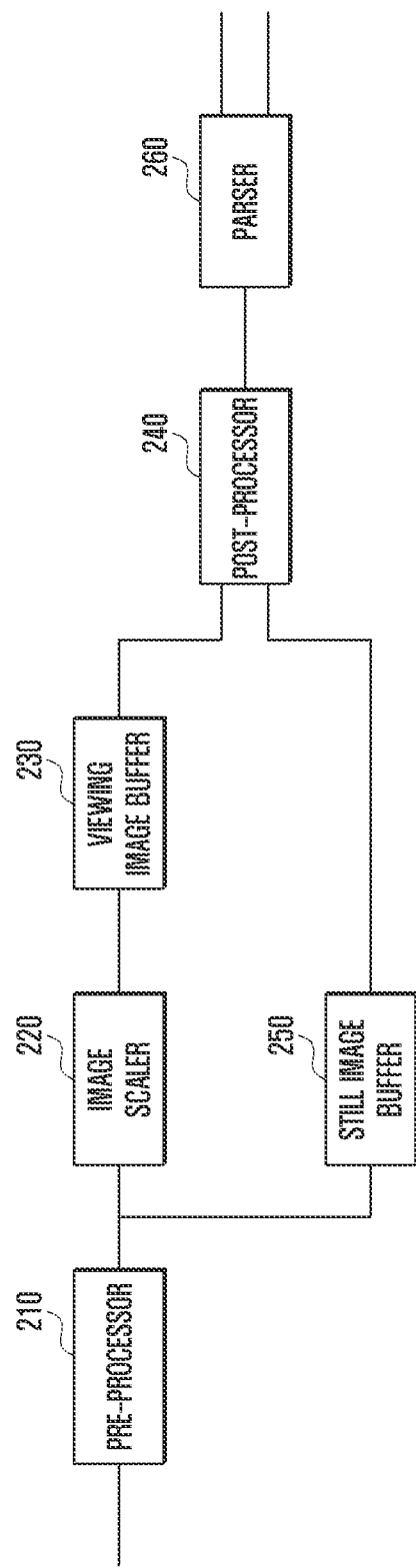
FIGS. 2A and 2B are block diagrams illustrating exemplary configurations of an image processor, such as the image processor of FIG. 1, according to an exemplary embodiment of the present invention.

Referring to FIG. 2A, a pre-processor 210 pre-processes the image acquired from the camera 110. The pre-processing function includes at least one of Auto White Balance (AWB), Auto Exposure (AE), Auto Focusing (AF), extraction and processing, lens shading correction, dead pixel correction, knee correction, and other similar and/or suitable pre-processing functions.

An image scaler 220 is responsible for scaling the camera's full resolution image to the viewing image size for display on the screen of the display unit 130 and/or the motion image size for the motion image being recorded. A viewing image buffer 230 buffers the viewing image output from the image scaler 220. Here, the viewing image buffer 230 is responsible for correcting the time for processing the viewing image within the frame period.

A still image buffer 250 buffers the camera's full resolution image output from the pre-processor 210. Here, the still image buffer 250 is configured to a size large enough to store a number of frame images which is capable of compensating for the shutter lag of the camera device, e.g., equal to or less than 5 frame images, in a ring buffer structure. The still image buffer 250 buffers the full resolution image output from the pre-processor 210 at every frame and, if requested, an image selected from the buffer under the control of the control unit 100.

A post-processor 240 receives the viewing image and/or the still image output by the viewing image buffer 230 and/or the still image buffer 150 in a time divisional manner and performs color interpolation, noise reduction, color correction, and image conversion on an input image to generate YUV data. The post-processor 240 may include a color interpolator (not shown), an Image Processing Chain (IPC) (not shown), and an image converter (not shown). The color interpolator is responsible for color interpolation for converting the Bayer data to the color image. As described above, the image sensor of the camera 110 can be a CCD or CMOS image sensor. The CCD/CMOS image sensor may use a color filter array, and each pixel sensor has one of three color channels for generating a color image. The color interpolator is responsible for converting the pixels of the image output from the camera 110 to the color RGB as three colors of the pixels, which may be a full color conversion. The color interpolator is responsible for color interpolation function based on the correlation among the adjacent pixels. Basically, the process before the color interpolation is referred to as pre-process and the process after the color interpolation is referred to as post-process. The IPC performs noise reduction, gamma correction, and luminance correction. The image converter converts post-processed raw data or Bayer data to YUV data. For example, the post-processor 240 performs color interpolation on the pre-processed image and converts the post-processed image to a YUV image.

A parser 260 parses the post-processed image to the viewing and/or still images. The parser 260 outputs the image from the post-processor 240 to the display unit in the preview mode and, in the capture mode, parses the output of the post-processor 240 into the viewing images and still images such that the viewing image is output to the display unit 130 and the capture image is output to the still image codec. The parser 260 can be implemented in software or hardware. In the case of the software parser, the control unit 100 controls the viewing image buffer 230 and the still image buffer 250 to select the image from the post-processor 240 and controls the parser 260 to parse the viewing and still images at every frame period. In the case of the hardware parser, a demultiplexer, such that the control unit 100 controls the demultiplexer to output the viewing and still images to the respective display unit 130 and the still image codec 190, may be used.

The still image codec 190 encodes the capture image output from the parser 260 to be compressed, the compressed capture image being stored in the storage unit 120. Here, the still image codec 190 can be a Joint Photographic Experts Group (JPEG) codec or any other similar and/or suitable codec for images. In the motion image recording mode, the viewing image parsed by the parser 260 is supplied to the motion image codec 180, as well as the display unit 130, such that the motion image codec 180 stores the viewing image in the storage unit 120 as a compressed image under the control of the control unit 100.

A description is made of the operation of the above-structured image processor. If the user inputs a camera driving command to the input unit 140, the control unit 100 drives the camera 110. The image taken by the camera 110 can be a camera's full resolution Bayer image which is input to the pre-processor 210. The pre-processor 210 generates a frame image at every frame period under the control of the control unit 100. Here, the frame rate can be 30 Frames Per Second (fps) or higher, e.g., 60 fps. The pre-processor 210 performs AWB, AE, AF extraction, lens shading correction, dead pixel correction, knee correction, etc. on the frame image. The pre-processed image is still a full resolution image and supplied to the image scaler 220 and the buffer 250.

The image scaler 220 scales the full resolution image to fit the screen size of the display unit 130. Here, the image scaling can be performed with at least one of resizing, decimation, interpolation, crop, and summing and averaging. The image scaling reduces the number of pixels of the camera's full resolution image so as to fit the aspect ratio of the display unit 130. Here, the image scaling can be performed at various scaling ratios.

The image scaler 220 can be implemented with a resizer and/or a summing average unit. In the case that the image scaler 220 is implemented with the resizer, the resizer resizes the full resolution image to be fit for the display unit 130 in volume and size. At this time, resizing can be performed with at least one of decimation, interpolation, and crop. In the case that the image scaler 220 is implemented with a summing average unit, the summing average unit performs summing and averaging on the adjacent pixels of the image to reduce the number of pixels of the image. The summing average unit averages the adjacent pixels in the full resolution image output from the pre-processor 210 to reduce the number of pixels of the viewing image. The summing average unit is capable of enhancing a signal-to-noise ratio and the resolution through pseudo-Foveon method. The pixels of the image output from the camera 110 patterned such that four adjacent pixels consist of one R pixel, one B pixel, and two G pixels. By averaging the four pixels into one pixel, it is possible to scale the image at the ratio of 4:1. In an exemplary embodiment of the present invention, the description is made under the assumption that the summing average unit sums and averages the four pixels into one pixel. In an exemplary embodiment of the present invention, the summing average unit sums and averages the two G pixels into one G pixel and processes the averaged G, R, and B pixels into one pixel. For example, pixels G11, B12, R21, and G22 are processed as R=R21, B=B12, and G=(G11+G22)/2 to be a pixel with an RGB value. Through the averaging operation, the four pixels are integrated into one pixel with accompaniment of color interpolation. Through pixel averaging, it is possible to scale down the four pixels into one pixel. At this time, the pixels are color-interpolated. However, the present invention is not limited thereto, and any suitable and/or similar number of pixels may be combined into one pixel.

The image-scaled pixels are buffered in the viewing image buffer 230. Here, the viewing image buffer 230 is responsible for adjusting the image processing timing of the viewing images. In the capture mode, the viewing image buffer 230 buffers the viewing image of the next frame until the still image is processed completely.

The still image buffer 250 buffers the full resolution image output from the pre-processor 210 at every frame period. At this time, the still image buffer 250 can be configured to have a ring buffer structure capable of buffering a predetermined number of frame images. For example, the still image buffer 250 can be implemented in the N-element ring buffer structure so as to buffer the frame image data output from the pre-processor 210 at every frame period. The frame image data are buffered in the ring buffer from its first element and, if the buffer is full, the oldest frame image data is overwritten with the new frame image data. Here, N may be set to a value equal to or less than 5 and, in this case, it is preferred to configure the still image buffer 250 as a 5-element ring buffer capable of buffering 5 or less image data. Assuming that the shutter delay or the shutter lag is equal to 2 frames, the still image buffer 250 can be configured as a 3-element ring buffer capable of buffering 3 frame images, such that N=3.

The image acquired from the camera 110 at every frame is buffered in the viewing image buffer 230 as viewing images and in the still image buffer 250 as still images. The control unit 100 controls the images buffered in the viewing image buffer 230 and the still image buffer 250 to be output in a time divisional manner within a frame period.

A description is made of the preview mode and/or motion image recording mode operations hereinafter.

As described above, the image taken by the camera at every frame is pre-processed and then scaled to be generated as a viewing image. The viewing image buffer 230 buffers the viewing image, and the still image buffer 250 buffers the still image. The control unit 100 reads out the buffered viewing image at the beginning part of the frame to the post-processor 240. The post processor 240 performs color interpolation, IPC, and image conversion on the viewing image to generate a YUC image. In the case of using the summing average unit for image scaling, the color interpolator of the post-processor performs only the color interpolation function by skipping the full color conversion on the pixel data. The viewing image processed by the post-processor 240 is sent from the parser 260 to the timing manager 170 and stored therein temporarily. The control unit 100 reads out the viewing image stored temporarily in the timing manager to the display unit and the storage unit 120 at a preset time of the frame period, e.g., the end part of the frame. The image processor according to an exemplary embodiment of the present invention processes the viewing image at the beginning part of the frame and sends the processed image to the display unit 130 and/or storage unit 120 at a timing delayed as much as a predetermined duration from the frame period or at the end time of the frame. The reason for processing the viewing image at the end part of the frame or a part close to the end of the frame is to process the still image in the capture mode.

A description is made of the capture mode operation hereinafter.

If a user inputs a still image shooting or capture request to the input unit 140 in the preview mode or motion image recording mode, then the control unit 100 selects the frame image with zero shutter lag from among the frame images buffered in the still image buffer 250. The control unit 100 selects, in the capture mode, the viewing image stored in the viewing image buffer 230 and sends the selected image to the post-processor 240 at the beginning part of the current frame period and controls the image output from the parser 260 to be sent to the timing manager 170. The viewing image processed by the post-processor 240 is stored in the timing manager 170 temporarily through the parser 260. Afterward, the control unit 100 selects the zero shutter lag frame image from the still image buffer 250 and sends the selected image to the post processor 240 at the residual part of the current frame. The post-processor 240 processes the input still image.

At this time, the still image can be the camera's full resolution image or less than that in size. It takes more time to process the still image of large size. In this case, the still image processing time may be longer than the frame period. Thus, if the time present in the current frame period, i.e., at a time elapsed from the frame start time or at the end time point, arrives in the middle of processing the still image, the control unit 100 sends the viewing image stored in the timing manager 170 to the display unit 130 and motion image codec 180. If a viewing image of the next frame is generated in the middle of processing the still image, the control unit 100 buffers the viewing image in the viewing image buffer 230. In this state, the post-processor 240 may be processing the still image of the previous frame. If the still image is processed completely, then the control unit 100 reads out the next frame viewing image buffered in the viewing image buffer 230 to the post-processor 240 and controls the parser 260 to deliver the post processed image to the timing manager 260. The next frame viewing image processed by the post processor 240 is sent to the timing manager 170 through the parser 260, and the viewing image stored in the timing manager 170 is read out to the display unit 130 and motion image codec 180 at the preset time of the frame period under the control of the control unit 100.

In the case that the still image is too large to be processed within one frame period, the still image may be processed across two frames. In this case, the image processor processes the viewing image first in the frame period where the capture request was detected and the still image at the residual part of the frame and at the beginning part of the next frame continuously while buffering the viewing image of the next frame in the viewing image buffer 230, and processes the buffered viewing image upon completion of the still image processing. At this time, the timing manager 170 stores the processed viewing image temporarily and outputs the viewing image at a preset time of the frame period such that the viewing image is displayed on the screen of the display unit 130 at the constant timing even when simultaneously processing the still image. Accordingly, when the capture command is input in the preview state or motion image shooting state, the viewing image can be displayed at every frame and even when the image processing time varies, the viewing image can be displayed at the same timing within the frame constantly.

Figure 2B:
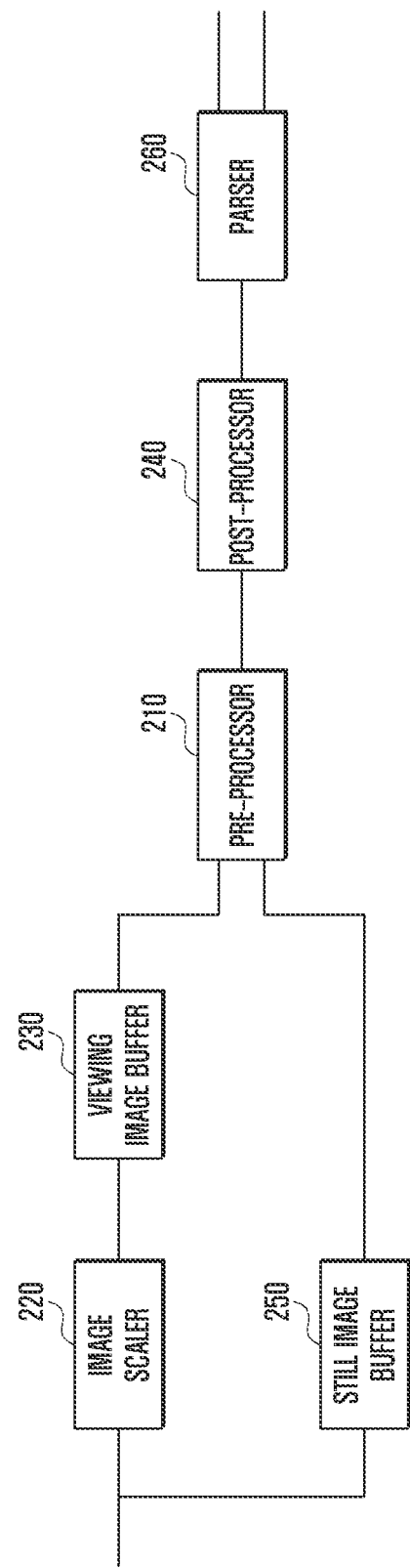

Referring to FIG. 2B the image scaler 220 adjusts the full resolution image output from the camera 110 to the viewing image size that fits the display unit 130 and/or the motion image size for storing as a motion image. The viewing image buffer 230 buffers the viewing image output from the image scaler 220. Here, the viewing image buffer 230 adjusts the time for processing the viewing image within the frame period.

The still image buffer 250 buffers the full resolution image output from the camera 110. Here, the buffer 250 may be configured to be a size capable of buffering a number of frame images large enough to compensate for the shutter lag of the camera device in a ring buffer structure. The buffer 250 buffers the full resolution image output from the pre-processor 210 at every frame and reads out a zero shutter lag image from among the buffered images as a still image under the control of the control unit 100.

The pre-processor 210 receives the viewing and/or still images output from the viewing buffer 230 and/or the still image buffer 250 in a time divisional manner and pre-processes the images. The control unit 100 controls transfer of the viewing image buffered in the viewing image buffer 230 to the pre-processor 210 in the preview mode and/or motion image recording mode and controls transfers of the images buffered in the viewing image buffer 230 and the still image buffer 250 to the pre-processor 210 in a time divisional manner within the frame period in the capture mode, e.g., snapshot mode. The pre-processor 210 is capable of performing AWB, AE, and AF extraction and processing, lens shading correction, dead pixel correction, knee correction, etc. The post processor 240 performs color interpolation, noise reduction, color correction, and image conversion to generate YUV data.

The parser 260 parses the images processed by the post-processor into the viewing and/or still images. The parser 260 transfers the output of the post processor 240 to the display unit 130 in the preview mode and parses, in the capture mode, the output of the post-processor 240 into the viewing image and the capture image, the viewing image being transferred to the display unit 130 and the capture image being transferred to the still image codec 260. The parser 260 can be implemented as a software parser or a hardware parser. In the case of the software parser, the control unit 100 controls the viewing image buffer 230 and the still image buffer 250 to select the image to be output to the post-processor 240 at every frame period and controls the parser 260 to parse the images output from the post-processor 240 into the viewing and still images. In the case of the hardware parser, it can be implemented as a demultiplexer such that the control unit 100 controls the demultiplexer to output the viewing image to the display unit 130 and the still image to the still image codec 190.

The still image codec 190 encodes the capture image output from the parser 260 to be compressed, the compressed image being stored in the storage unit 120. Here, the still image codec 190 can be a JPEG codec or any other similar and/or suitable codec for images. In the motion image recording mode, the viewing image parsed by the parser 260 is simultaneously supplied to the display unit 130 and the motion image codec 180 such that the motion image codec 180 encodes the viewing image compressively and stores the compressed motion image in the storage unit 120 under the control of the control unit 100. The motion image codec can be a H.264 codec or any other similar and/or suitable motion image codec.

In the image processor configured as shown in FIG. 2B, the output of the camera 110 is supplied to the image scaler 220 and the still image buffer 250, and the pre-processor 210 processes the outputs of the viewing image buffer 230 and the still image buffer 250 in a time divisional manner. Other configurations components of FIG. 2B are identical with that of FIG. 2A, and the operations of the components are also identical with those of the components of FIG. 2A.

Figure 3A:
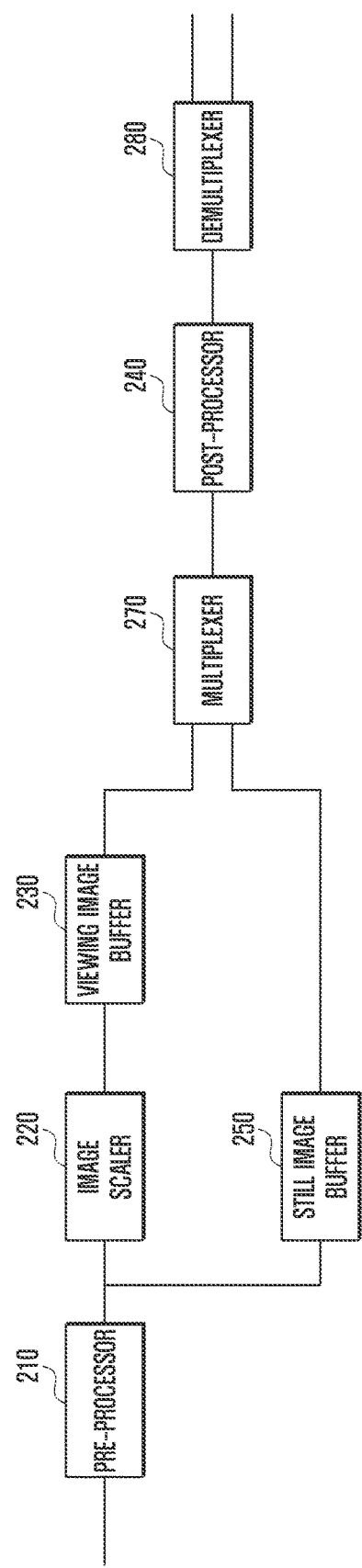
FIGS. 3A and 3B are block diagrams illustrating other exemplary configurations of an image processor, such as the image processor of FIG. 1, according to an exemplary embodiment of the present invention.

Referring to FIG. 3A, the pre-processor 210 pre-processes the image acquired from the camera 110. The image scaler 220 scales the camera's full resolution image output from the pre-processor 210 to the size that would fit the screen of the display unit 130 and/or the image size for storing motion image. The viewing image buffer 230 buffers the viewing image output by the image scaler 220. The still image buffer 250 buffers the camera's full resolution image output from the pre-processor 210. Here, the buffer 250 can be configured to have a size large enough to buffer the frame images capable of compensating the shutter lag of the camera device in a ring buffer structure.

The multiplexer 270 multiplexes the images output from the viewing image buffer 230 and the still image buffer 250 under the control of the control unit 100. The post-processor 240 performs color interpolation, noise reduction, color correction, and image conversion on the images multiplexed by the multiplexer 270 to generate the YUC data. The demultiplexer 280 demultiplexes the output of the post-processor 240 into the viewing and/or still images. The demultiplexer 280 supplies the output of the post-processor 240 to the display unit 130 in the preview mode and demultiplexes, in the capture mode, the output of the post processor 240 into the viewing and still images so as to output the viewing image to the display unit 130 and the capture image to the still image codec 260.

The image processor 200 configured as shown in FIG. 3A includes the multiplexer 270 and the demultiplexer 280 to establish the viewing image and still image processing paths, and the other included components and their operations are identical with those of FIG. 2A. A description is made of the image processor 200 configured as shown in FIG. 3A hereinafter. In the preview mode, the control unit 100 sends a control signal to the multiplexer 270 to select the output of the image scaler 220 and controls the demultiplexer 280 to supply the output of the post-processor 240 to the display unit 130. In this case, the post-processor 240 can be configured so as to process the image having the viewing image size.

In the preview mode, the image taken by the camera 110 is a full resolution image, and the pre-processor 210 pre-processes the camera's full resolution image and outputs the processed image to the image scaler 220 and the still image buffer 250 at every frame. The image scaler 220 scales the full resolution image to a viewing image, and the viewing image buffer 230 buffers the viewing image. The still image buffer 250 buffers the camera's full resolution image output from the pre-processor up to the predetermined number. The multiplexer 270 selects the output of the viewing image buffer 230 and the demultiplexer 280 selects the output of the post-processor 240 under the control of the control unit 100. For example, the control unit 100 controls the multiplexer 270 and the demultiplexer 280 to establish the preview image processing path but not the capture image processing path in the preview mode.

As described above, the image processor controls the multiplexer 270 and the demultiplexer 280 to establish the viewing image processing path in the preview mode or a motion image recording mode such that the pre-processor 210, the image scaler 220, the viewing image buffer 230, and the post-processor 240 operate to process the image taken by the camera 110 into an image to be displayed on the display unit 130 at every frame while the full resolution images are buffered in the still image buffer 250. At this time, the viewing image is in the down-scaled state while the high resolution images are just being buffered for capture, and the camera device is in the state of operating with relatively low power consumption and heat generation.

Typically, a camera takes an image delayed a certain number of frames from the timing of the image presented on the viewfinder or display unit 130 due to the shutter delay. For example, there is a delay, such as a shutter lag or time lag, between triggering the shutter and when the camera records an image actually. The time delay is variable depending on the camera, and the control unit 100 should know the delay time acquired statistically. According to an exemplary embodiment of the present invention, the camera device buffers the images acquired by the camera 110 by determining the shutter lag and selects the frame image taken at the timing when the shutter is triggered as a capture image from among the buffered images, resulting in zero shutter lag.

If a capture request is input through the input unit 140 in the preview mode or motion image recording mode, then the control unit 100 detects the shutter press time and selects one of the images buffered in the still image buffer 250, by determining the preset delay time, as the capture image. The control unit 100 controls the multiplexer 270 and the demultiplexer 280 to establish the viewing image and capture image processing paths. For example, the control unit 100 controls the multiplexer 270 and the demultiplexer 280 to establish the viewing image processing path and then the capture image processing paths subsequently. Since the capture image or still image is high pixel data, it may not be processed within one frame period.

In the case that the still image is too large to be processed within one frame period, the method according to an exemplary embodiment of the present invention processes the image across two frames. In this case, the control unit 100 controls the multiplexer 270 and the demultiplexer 280 to establish the viewing image processing path first and then the capture image processing path at the residual part of the frame period. The capture image processing path is maintained at the beginning part of the next frame such that the next frame image generated by the image scaler 220 is buffered in the viewing image buffer 230. Once the still image processing has been completed, the control unit 100 controls the multiplexer 270 and the demultiplexer 280 to establish the viewing image processing path such that the viewing image buffered in the viewing image buffer 230 is output. The next frame viewing image is processed through the established viewing image processing path.

At this time, the viewing image output from the demultiplexer 280 is stored in the timing manager 170 temporarily and then output at the preset time of the frame period. As aforementioned, the present part can be positioned at the end of the frame or close to the end of the frame. Accordingly, even when the viewing image processing timing of the image processor 200 varies, the viewing image output timing is adjusted by the timing manager 170 such that the viewing images are displayed at constant time position of the frame.

In the capture mode, the control unit 100 controls the multiplexer 270 to select the viewing image buffered in the viewing image buffer 230 at the beginning of the current frame period and to supply the selected viewing image to the post-processor 240 and the demultiplexer 280 to output the processed viewing image to the timing manager 170. Accordingly, the viewing image buffered in the viewing image buffer 230 is supplied to the post-processor 240 through the multiplexer 270 so as to be processed by the post-processor 240 and then transferred to the timing manager 170 via the demultiplexer 280, the viewing image being stored in the timing manager 170 temporarily.

Afterwards, the control unit 100 controls, at the residual part of the frame where the capture request has been occurred, the multiplexer 270 to establish the capture image processing path in order to transfer the zero shutter lag frame image selected from the still image buffer 250 to the post-processor 240 such that the post-processor 240 processes the zero shutter lag still image. At this time, the still image can be the camera's full resolution image and, in this case, the still image processing time may be longer than the frame period. In this case the control unit 100 controls the multiplexer 270 and the demultiplexer 280 to maintain the capture image processing path at the next frame. If the preset time, which is a time point delayed as much as a predetermined duration from the start point of the frame or end time point, arrives within the current frame in the middle of processing the still image, the control unit 100 controls to supply the viewing image temporarily stored in the timing manager 170 to the display unit 130 and motion image codec 180.

If the next frame viewing image is generated in the middle of processing the still image, then the control unit 100 controls buffering of the viewing image in the viewing image buffer 230. In this state, the post-processor 240 may be in the state of processing the previous frame still image. If the still image processing has been completed, then the control unit 100 controls the multiplexer 270 and the demultiplexer 280 to establish the viewing image processing path, to read out the next frame viewing image buffered in the viewing image buffer 230 to the post-processor 240, and to supply the output of the post-processor 240 to the timing manage 170. The next frame viewing image processed by the post-processor 240 is transferred to the timing manager 170 via the demultiplexer 280, and the viewing image stored in the timing manager 170 is accessed and input to the display unit 130 and the motion image codec 180 at the preset time of the frame period under the control of the control unit 100.

Figure 3B:
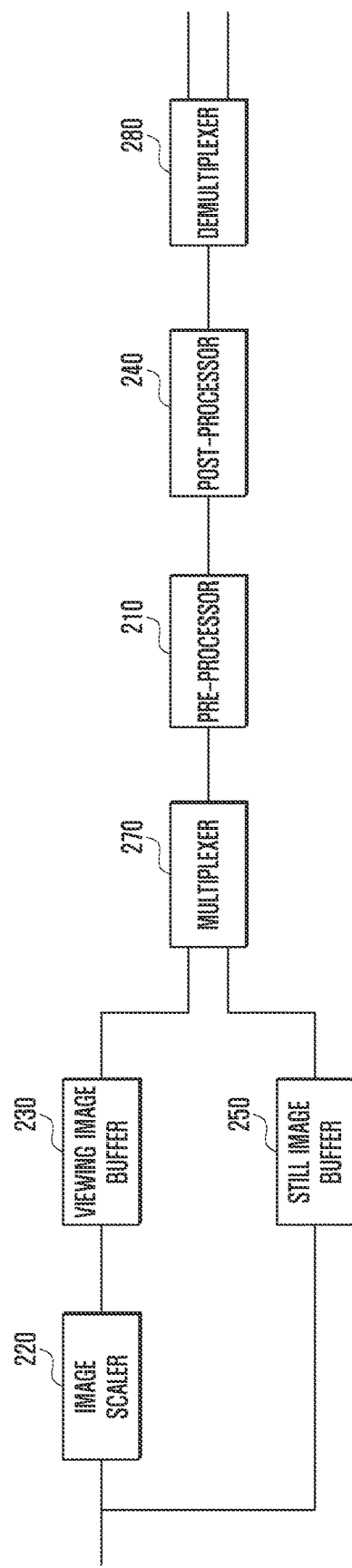

Referring to FIG. 3B, the image scaler 220 adjusts the full resolution image output from the camera 110 to fit a screen size of the display unit 130 and/or a size of the image to be stored as a motion image. The viewing image buffer 230 buffers the viewing images output from the image scaler 220. Here, the viewing image buffer 230 is responsible for adjusting the time of processing the viewing image within the frame period.

The still image buffer 250 buffers the full resolution image output from the camera 110. Here, the buffer 250 can be formed in a ring buffer structure capable of buffering a predetermined number of frame images. The buffer 250 buffers the full resolution image output from the pre-processor 210 at every frame and, if a capture request is detected, outputs the zero shutter lag image selected from among the buffered image as a still image under the control of the control unit 100.

The multiplexer 270 multiplexes the outputs of the viewing image buffer 230 and the still image buffer 250 under the control of the control unit 100. The pre-processor 210 pre-processes the images multiplexed by the multiplexer 270. The post-processor 240 performs color interpolation, noise reduction, color correction, and image conversion on the pre-processed images to generate YUV data. The demultiplexer 280 demultiplexes the image post-processed by the post-processor 240 into viewing and/or still images. The demodulator 280 supplies the output of the post-processor 240 to the display unit 130 in the preview mode and demultiplexes, in the capture mode, the output of the post-processor 240 into the viewing and still images such that the viewing image is supplied to the motion image codec 180 and the capture image to the still image codec 190.

The image processor configured as shown in FIG. 3B supplies the output of the camera 110 to the image scaler 220 and the still image buffer 250 simultaneously, and the pre-processor 210 is configured to process the outputs of the viewing image buffer 230 and the still image buffer 250 in a time divisional manner. The other components of the image processor of FIG. 3B are identical with those of FIG. 3A, and the operations of the individual components are also identical with those of the image processor of FIG. 3A.

Figure 4:
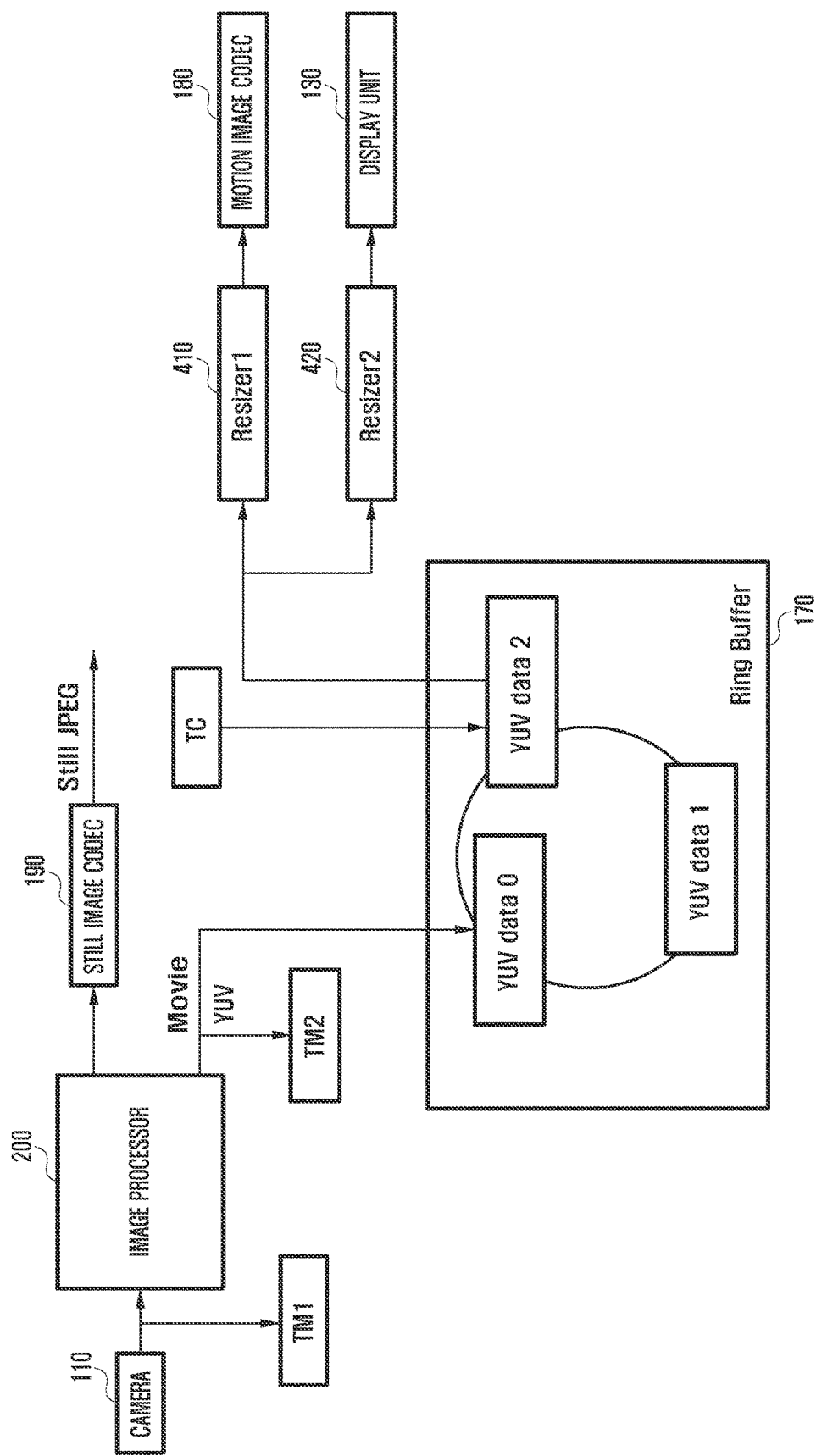
FIG. 4 is a block diagram illustrating an image processor processing motion and still images according to an exemplary embodiment of the present invention.

FIG. 4 is a block diagram illustrating an image processor processing motion and still images according to an exemplary embodiment of the present invention. FIGS. 5 to 8 are timing diagrams illustrating operation timings of an image processor, such as the image processor of FIG. 4.

Referring to FIGS. 4 to 8, the image processor according to an exemplary embodiment of the present invention stores a still image in the middle of processing motion image such that the viewing image is controlled to be displayed in adaptation with the motion image stream. For example, the present exemplary embodiment proposes a method for displaying and storing a motion image stably at every frame by controlling the image processor processing the motion and still images in a time divisional manner to output the motion image at a preset time of the frame period.

Referring to FIG. 4, the image processor 200 is capable of be configured as shown in any one of FIGS. 2A, 2B, 3A, and 3B. In FIG. 4, Time Monitor 1 (TM1), Time Monitor 2 (TM2), and Time Controller (TC) denote timers. TM1 indicates the time when the motion image stream is input in the image processor 200, TM2 indicates the time delay processed in the image processor 200, and TC, which is for a memory read, indicates the time when the processed motion image is output finally. The timing manager 170 can be implemented with a buffer, and FIG. 4 is depicted under the assumption that the timing manager 170 is implemented in a ring buffer structure capable of storing three frames temporarily. A resizer 1 410 and a resizer 2 420 are responsible for resizing an image to a motion image recording size and viewing image size.

Figure 5:
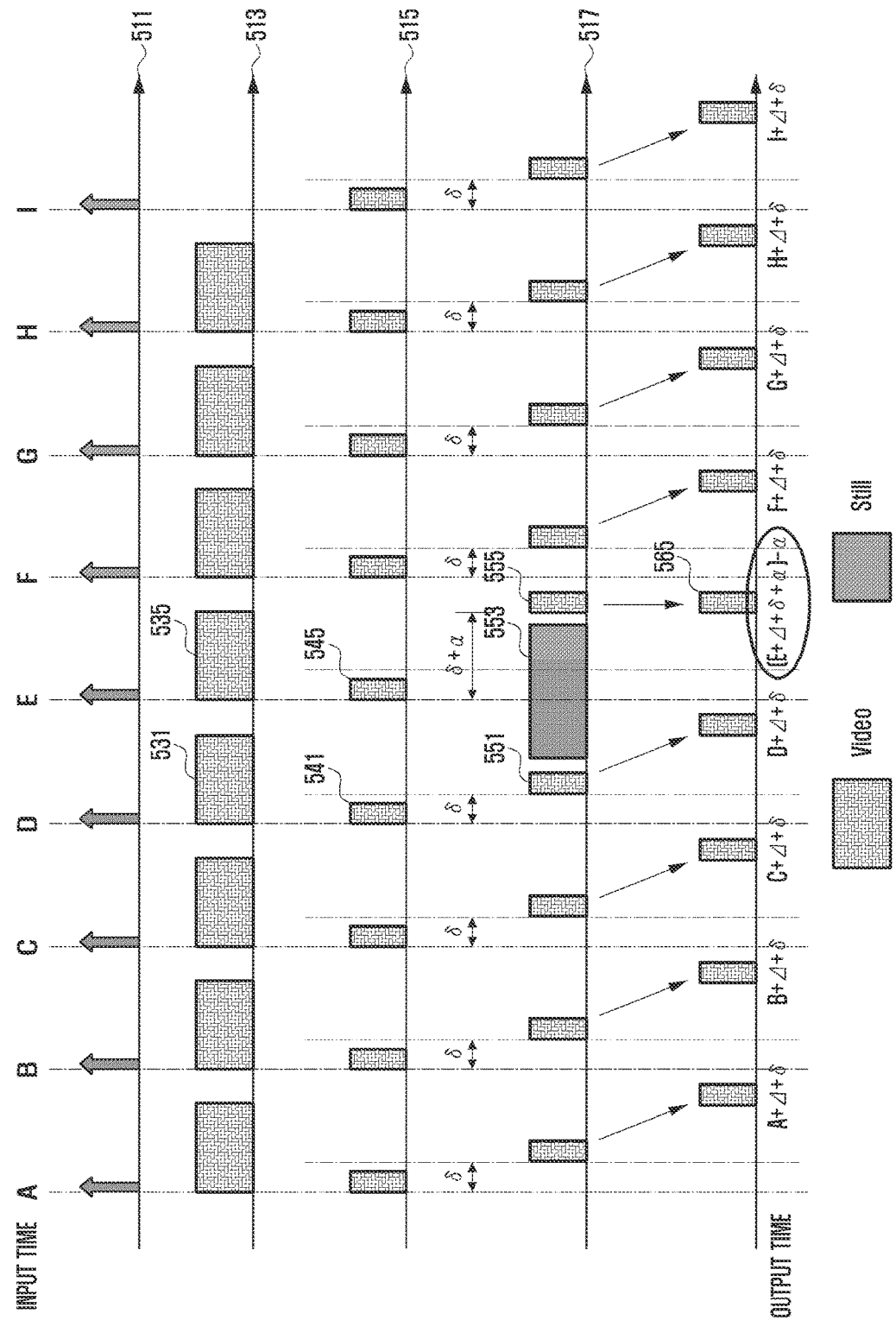
FIG. 5 is a timing diagram illustrating operation timings of an image processor, such as the image processor of FIG. 4, according to an exemplary embodiment of the present invention.

FIG. 5 is a timing diagram illustrating operation timings of an image processor when a camera generates a motion image stream at a regular interval according to an exemplary embodiment of the present invention.

The motion image stream generated by the camera 110 is input to the image processor 200, as denoted by reference number 513, by a vertical synchronization signal v-sync, as denoted by reference number 511. At this time, the video stream input to the image processor 200 at a regular interval, as denoted by reference number 513, is input to the timing manager 170 with a delay as much as the image processing time "δ", as denoted by reference number 517. In the case of the frame in which both the motion and still images have to be processed, such as frame D in FIG. 5, the image processor 200 may be incapable of processing the still images. In this case, the image processor 200 may process the video stream over a D frame period to a next frame E, having a delay as much as "δ+α". If the video stream processed in this way is displayed or compressed by the motion image codec 180 for playback, then the motion image is generated irregularly. In order to overcome this problem, the method, according to an exemplary embodiment of the present invention, records the image output by the camera 110, as denoted by reference number 513, with the V_sync, as denoted by reference number 511, with the time TM1 in the image processor 200 and displays the image output by the image processor 200 at the time TM2 synchronized with V_sync, as denoted by reference number 517. The video stream output by the image processor 200, as denoted by reference number 517, is stored in the timing manager 170, i.e., the ring buffer, and is displayed on the display unit 130 or encoded by the motion image codec 180 by determining the write and read times Δ1 and Δ2 in the timing manager 170. For example, the video stream is regulated to be output at the preset time of every frame period by controlling the read time of the video stream buffered in the timing manager 170.

At this time, TC is processed according to the following conditions:

TC=TM1+Δ1, if a frame rate is regular;

or, TC=TM2+Δ2+K, wherein K=TM2−TM1=δ, if only a video stream is processed, and

K=δ−α, if a video stream and still image are processed together.

Accordingly, if a still image is stored in the middle of processing the motion image, which is frame D in FIG. 5, then the image processor 200 receives the image from the camera 110, as denoted by reference number 531, and generates a frame D viewing image, as denoted by reference number 541, and buffers the viewing image in the viewing image buffer 230. The control unit 100 supplies the viewing image to the image processor 200, which may include the post-processor in FIG. 2A and pre-processor and post-processor in FIG. 2B, to perform image processing operation and buffers the processed image in the timing manager 170, as denoted by reference number 551. The still image buffer 250 buffers the still image, as denoted by reference number 531, and the control unit 100 supplies the still image, i.e., zero shutter lag image, to the image processor 200 in response to the shooting request. The image processor 200 processes the still image as denoted by reference number 553. At this time, the image processor 200 occupies the time resource of frame D period and frame E period to process the still image. Here, the E frame occupancy time for still image processing is ($\delta+\alpha$).

In this case, the control unit 100 reads the viewing image buffered in the timing manager 170 to the display unit 130 and motion image codec 180 at the viewing image output time of frame D. In this case, the image processor 200 is capable of displaying the viewing image of the corresponding frame at the normal output timing in the middle of processing the still image. The image generated in the frame E period, as denoted by reference number 535, can be generated by the image processor 200 as the viewing image, as denoted by reference number 545, and buffered in the viewing image buffer 230. Once the still image processing has completed, i.e., a time elapses as much as ($\delta+\alpha$) in the frame E period, then the control unit 100 detects this and supplies the processed still image to the still image codec 180 and reads out the buffered viewing image of the frame E from the viewing image buffer 230 at the timing 555 for processing. The processed viewing image is buffered in the timing manager 170 at the timing 565, and the viewing image buffered in the timing manager 170 is supplied to the display unit 130 and motion image codec at the timing 565.

The image processor 200 for processing the motion and still images in a time-divisional manner, according to an exemplary embodiment of the present invention, processes the motion image first and stores the processed motion image temporarily and output the motion image at the end part of the frame. The image processor 200 capable of storing a still image while processing a motion image is capable of outputting the motion image streams at a regular interval regardless of the camera 110 output interval.

Figure 6:
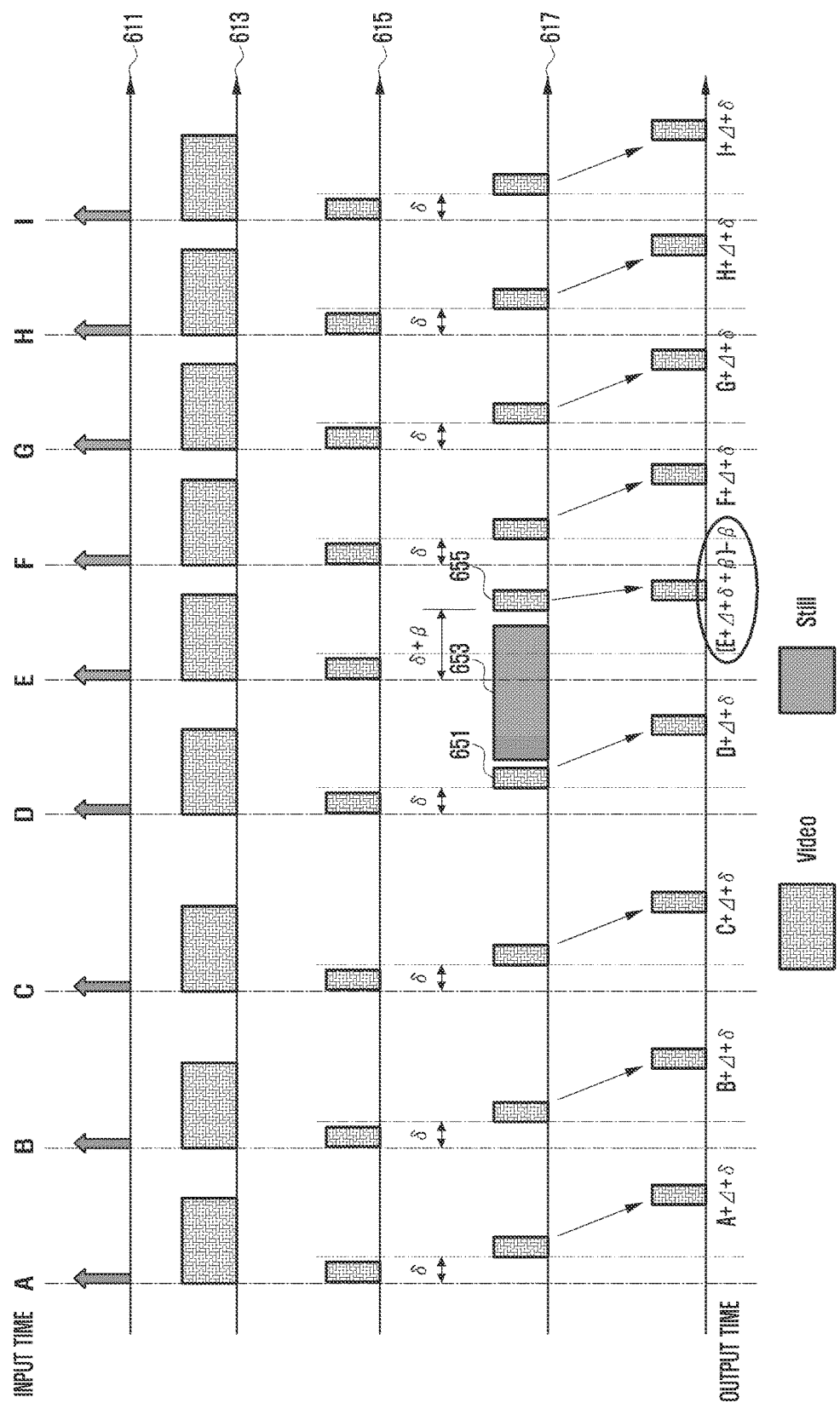
FIG. 6 is a timing diagram illustrating operation timings of an image processor, such as the image processor of FIG. 4, according to an exemplary embodiment of the present invention.

FIG. 6 is a timing diagram illustrating operation timings of an image processor when a camera generates a motion image stream at an irregular interval according to an exemplary embodiment of the present invention.

In the case that the images output by the camera 110 are input to the image processor 200 at a regular interval, as denoted by reference numbers 611 and 613, the image processor 200 generates the viewing image of the motion image stream, as denoted by reference number 615, and the video stream is processed by the image processor 200 with the delay as much as "$\delta$", as denoted by reference number 617. As described with reference to FIG. 5, when the still image is processed along with the motion image, the image processor 200 may undergo lack of capability and thus the motion image stream may be delayed as much as "$\delta+\beta$" in the next frame, wherein "$\delta+\beta$" is a motion image processing time in frame E when the still image capture request is input in frame D. In this case, the image processor controls processing of the viewing image 651, first, and then the still image 653 at the residual part of the frame and continuously at the next frame, and then controls processing of the next frame viewing image 655 at the residual part of the next frame. At this time, the viewing image output timing is controlled to occur at the end part of every frame period. In this case, the image processor is capable of processing the images output by the camera to be displayed or encoded by the codec at a regular interval on the same conditions as described with reference to FIG. 5.

TC=TM1+$\Delta$1, if frame rate is regular;
or TC=TM2+$\Delta$2+K,
wherein, K=TM2−TM1=$\delta$, if only a video stream is processed, and K=$\delta-\beta$, if a video stream and still image are processed together.

Figure 7:
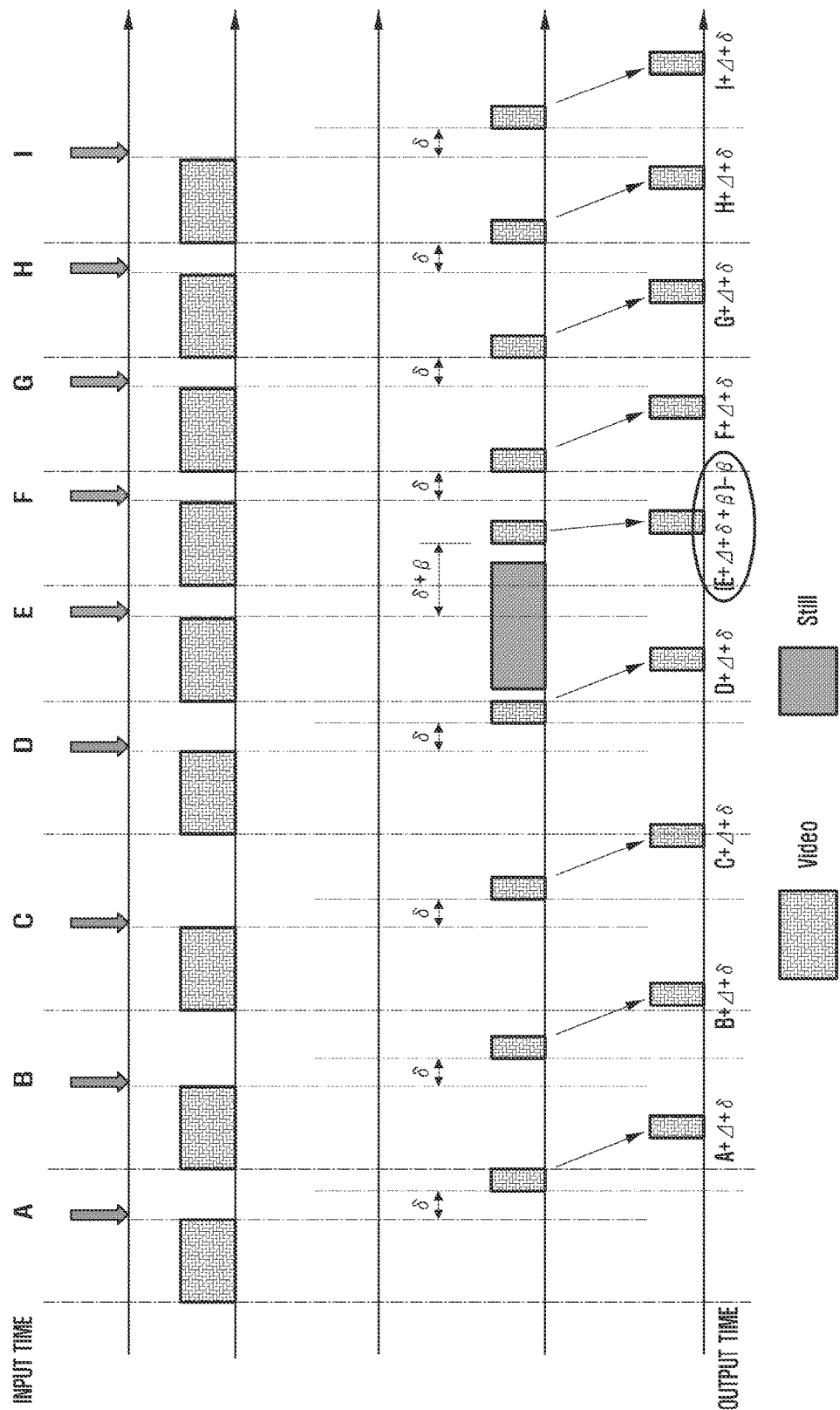
FIG. 7 is a timing diagram illustrating operation timings of an image processor, such as the image processor of FIG. 4, according to an exemplary embodiment of the present invention.

FIG. 7 is a timing diagram illustrating operation timings of an image processor when a video stream is input at an irregular interval and a reference time is a frame end according to an exemplary embodiment of the present invention. FIG. 7 shows an exemplary case where the video stream is processed at the end part of the frame and other operations are identical with those of FIG. 6.

Figure 8:
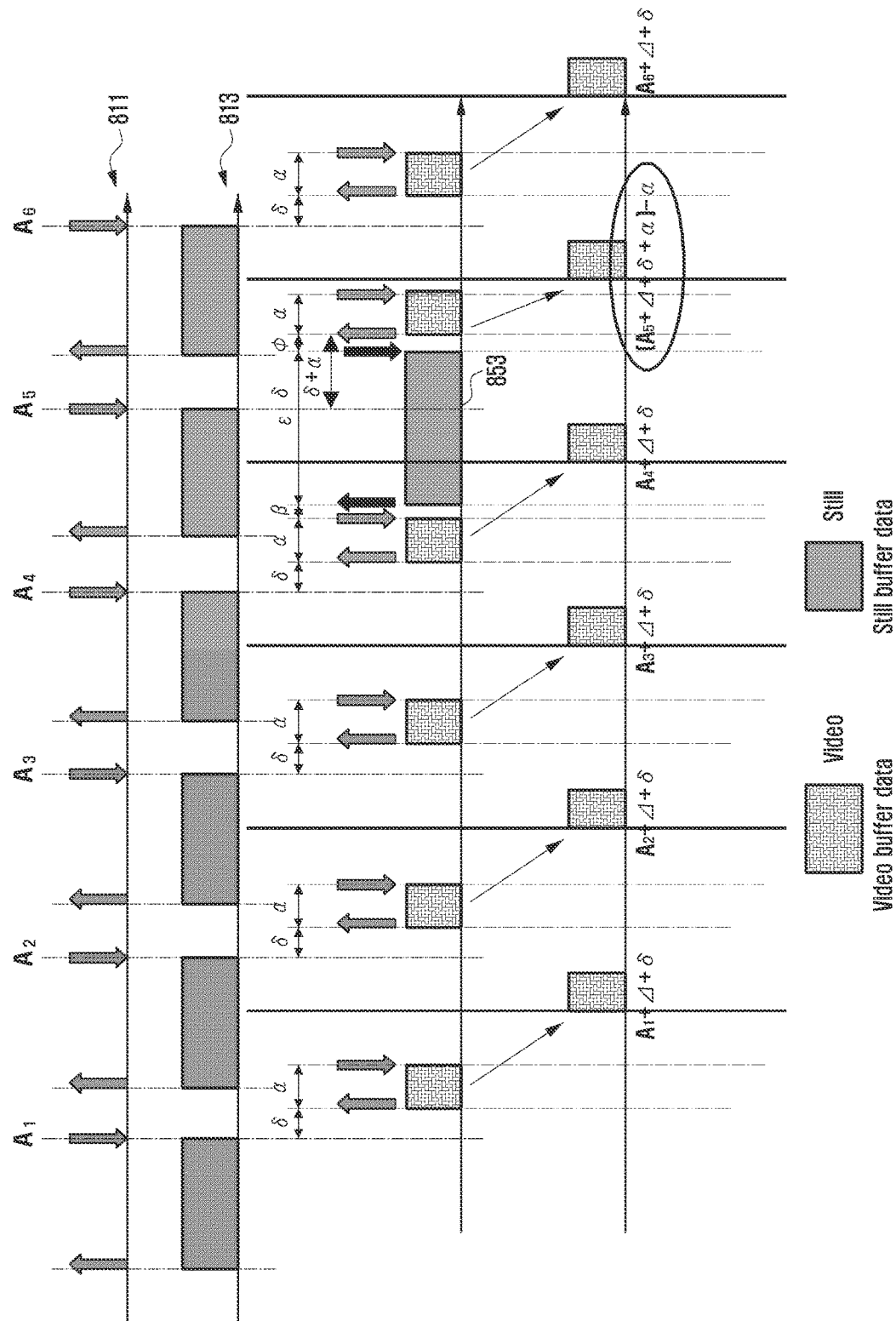
FIG. 8 is a timing diagram illustrating operation timings of an image processor, such as the image processor of FIG. 4, according to an exemplary embodiment of the present invention.

FIG. 8 is a timing diagram illustrating operation timings of an image processor when a reference time is set to frame end according to an exemplary embodiment of the present invention.

Referring to FIG. 8, when the synchronization signal is generated, as denoted by reference number 811, the camera 110 outputs images, as denoted by reference number 813. In the case that the reference time is set to the frame end, the preview images are output after $\delta$ from the interrupt occurrence time Ai at the raw frame end, as denoted by reference number 813. If a still image shooting request is input in the frame A4, the preview image is output after $\delta$ in the frame A4, and there is a need of minimum V_blank time at least for image processing, then the minimum V_blank time varies depending on the image size. In the case of processing a still image 853 immediately after processing a preview image, the still image processing is initiated at the time point after the time duration of $\beta$ elapses. The still image processing continues to the next frame, which is frame A5, and, the time delay between the completion of the still image processing and the output timing of the next frame preview image, viewing image of frame A5, is $\varphi$. At this time, $\beta$ has to be greater than the minimum V_blank time of the preview image, and $\varphi$ has to be greater than the minimum V_blank time of the still image.

FIGS. 4 to 8 show the exemplary cases of image processors and output timings of the motion and still images in the image processors operating in a time divisional manner. However, the camera device or camera-equipped electronic device may be provided with an image processor of FIG. 4 and an extra application processor. In this case, the image processor processes the images taken by the camera 110 while the application processor performs displaying images processed by the image processor and storing the motion and still images. In this case, the camera device can be configured to operate in such a way that the image processor, which processes the still and motion images in a time divisional manner, processes $\delta$2 and $\alpha$ as metadata of each frame and the application processor controls the output of the motion and still images finally.

Figure 9:
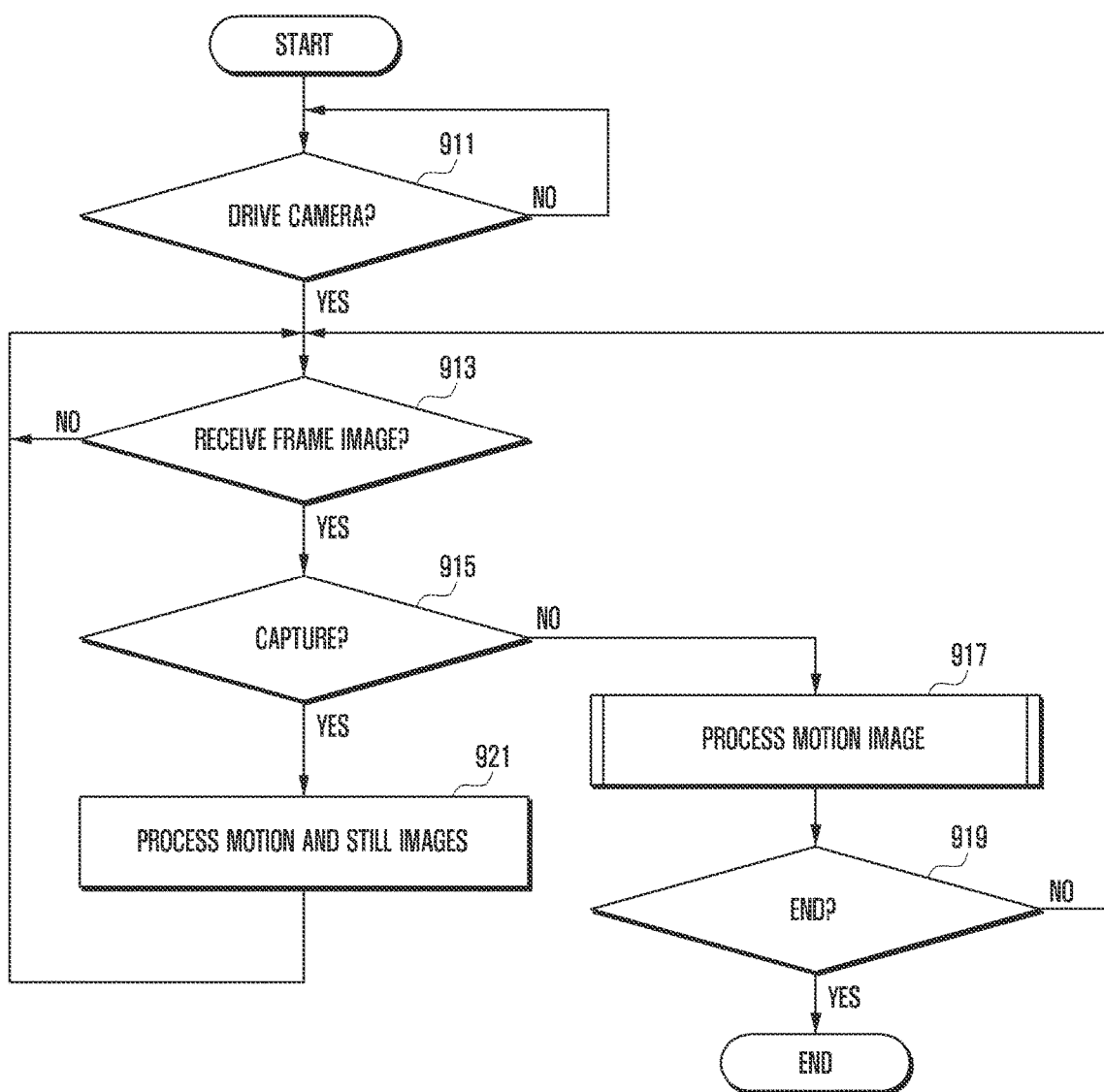
FIG. 9 is a flowchart illustrating an image processing method of a camera device or camera-equipped electronic device according to an exemplary embodiment of the present invention.

FIG. 9 is a flowchart illustrating an image processing method of a camera device or camera-equipped electronic device according to an exemplary embodiment of the present invention.

Referring to FIG. 9, the camera devices can be configured as shown in any of FIGS. 1 and 4, and the image processor can be configured as shown in any of FIGS. 2A, 2B, 3A, and 3C. The motion image processing mode includes both the preview mode and the motion image recording mode. As shown in FIG. 9, if it is determined at step 911 that a camera driving command is input through the input unit 140, then the control unit 100 drives the camera 110 at step 913 and determines if it has received the frame image from the camera 110 at step 913. Next, the control unit 100 determines whether the camera is operating in the capture mode at step 915 and, if the camera is not in the capture mode, process the motion image so as to read out the processed viewing image in a preset time of the frame period at step 917. For example, when the device operates in the motion image processing mode, the control unit 100 processes the frame images output from the camera 110 to output viewing images at the preset time of the frame period. After the completion of the motion image processing, the control unit 100 determines whether a procedure termination command, such as an END command, is detected at step 919 and, if so, ends the procedure and, otherwise, returns the procedure to step 913. If the camera is operating in the capture mode in which the motion and still images are processed simultaneously, then the control unit 100 detects the capture mode operation at step 915 and controls the image processor to process the motion and still images in a time divisional manner at step 921.

Figure 10:
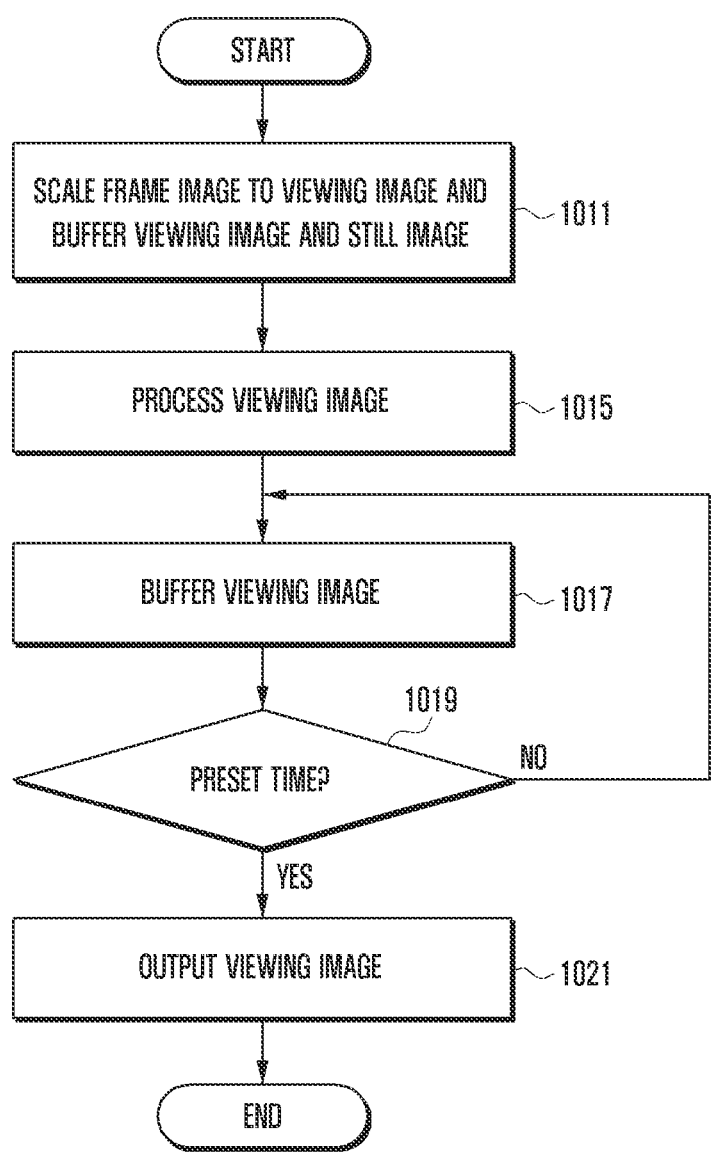
FIG. 10 is a flowchart illustrating a viewing image processing procedure in a motion image processing mode of an image processor according to an exemplary embodiment of the present invention.

FIG. 10 is a flowchart illustrating a viewing image processing procedure in a motion image processing mode of an image processor according to an exemplary embodiment of the present invention.

Referring to FIG. 10, if a frame image is received from the camera 110, then the control unit 100 scales the frame image to a viewing image and buffers the viewing image in the viewing image buffer 230 while buffering the camera's full resolution image in the still image buffer 250 at step 1011. Next, the control unit 100 establishes a viewing image processing path and processes the viewing image at step 1015. The image processing may include the pre-processing and post-processing steps or only the post-processing step. Next, the control unit 100 controls the timing manager 170 to buffer the processed viewing image temporarily, at step 1017, and, if a preset time arrives within the corresponding frame, then detects this at step 1019 and outputs the temporarily stored viewing image to the display unit 130 and the motion image codec 180 at step 1021.

Figure 11:
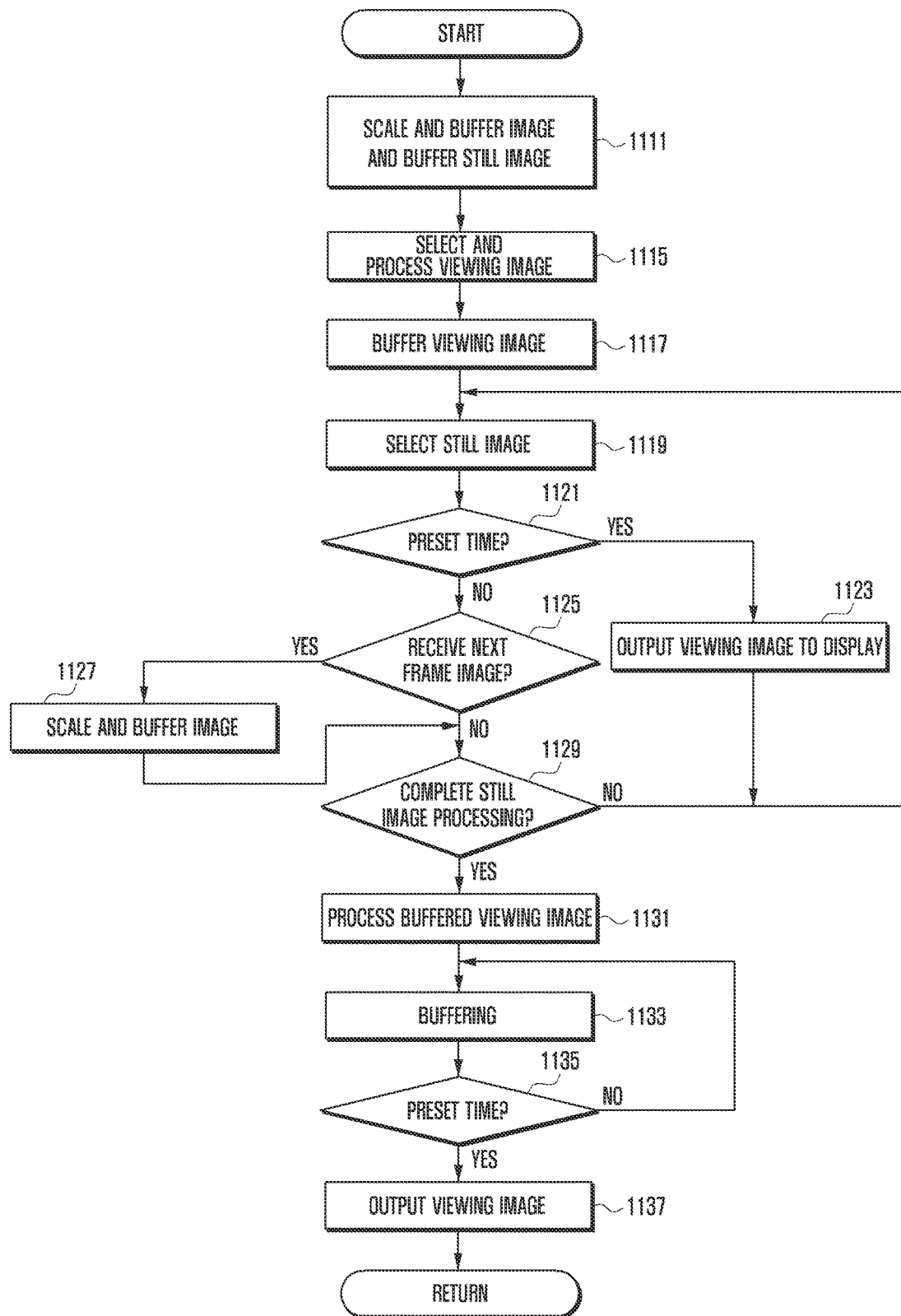
FIG. 11 is a flowchart illustrating a procedure of processing motion and still images in an image processing method according to an exemplary embodiment of the present invention.

FIG. 11 is a flowchart illustrating a procedure of processing motion and still images in an image processing method according to an exemplary embodiment of the present invention.

Referring to FIG. 11, the control unit 100 controls scaling of the image output from the camera 110 to generate a viewing image and buffering of the viewing image in the viewing image buffer 230 at step 1111. At this time, the control unit 100 also controls the images output from the camera 110 to be buffered in the still image buffer 250. Afterward, the control unit 100, at step 1115, controls selection and processing of one of the viewing images buffered in the viewing image buffer 230 and stores or buffers the processed viewing image, at step 1117, in the timing manager 170 temporarily. The reason for storing the viewing image in the timing manager 170 temporarily is to regulate the viewing image output timing even when processing the still image.

After the viewing image is stored in the timing manager 170, the control unit 100 selects the zero shutter lag still image from among the still images buffered in the still image buffer 250 at step 1119. At this time, the still image, which is a high pixel image, can be processed for duration longer than the frame period. If the viewing image output timing, which is a preset time, arrives in the middle of processing the still image, i.e., the time assigned for viewing image within the frame arrives, then the control unit 100 detects this at step 1121, controls outputting of the viewing image stored in the timing manager 170 to the display unit 130 and the motion image codec 180 at step 1123, and returns the procedure to step 1119 to continue the still image processing procedure.

If the next frame arrives in the middle of processing the still image at step 1119, then the control unit 100 detects receipt of the next frame image from the camera 110 at step 1125 and scales the image to a viewing image and buffers the scaled viewing image in the viewing image buffer 230 at step 1127 while buffering the received image in the still image buffer 250. The control unit 100 continues processing the still image while receiving and buffering the next frame image.

If the still image processing has been completed while in this state, then the control unit 100 detects this at step 1129, outputs the still image to the still image codec 190 and processes the viewing image buffered in the viewing image buffer 230 at step 1131, and stores, or buffers, the processed viewing image in the timing manager 170 temporarily at step 1133. If the viewing image output time, which is the preset time, arrives, then the control unit 100 detects this at step 1135 and reads out the temporarily stored viewing image to the display unit 130 and the motion image codec 180 at step 1137.

As described above, the image processor 200, according to an exemplary embodiment of the present invention, processes the motion and still images in a time divisional manner and, when a still image capture command is input in the motion image processing mode, rearranges the output timing of the viewing image such that the viewing image is displayed on the display 130 at a constant timing in the frame period.

Figure 12:
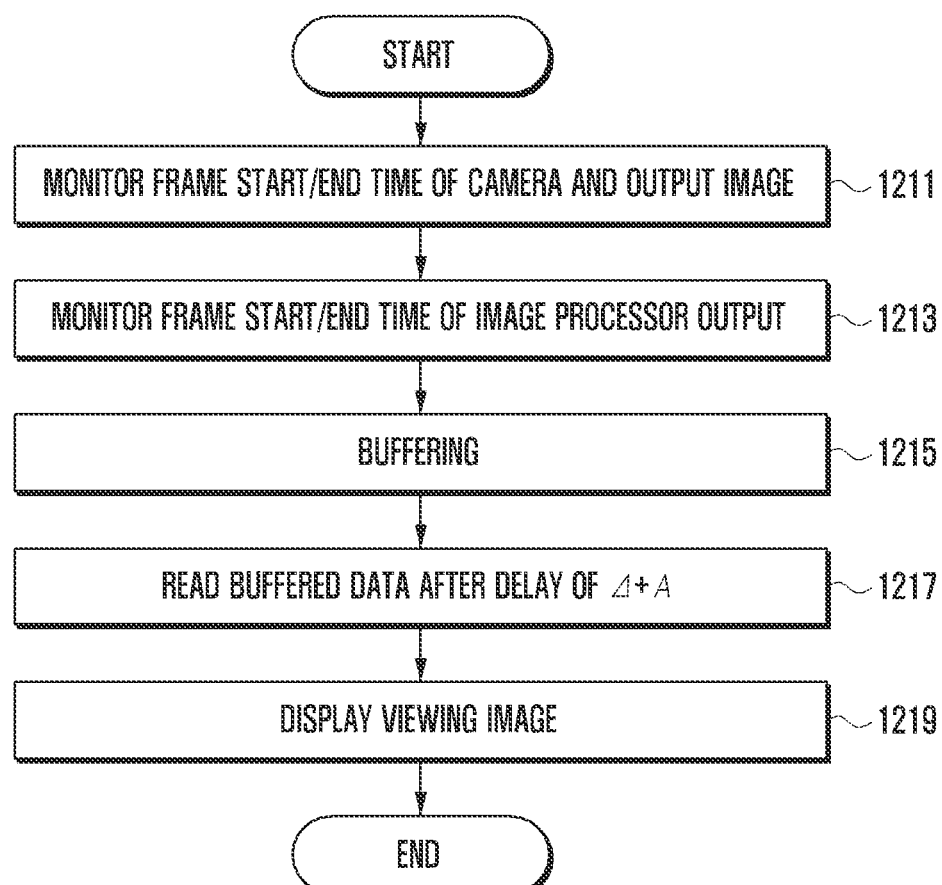
FIG. 12 is a flowchart illustrating the procedure of controlling viewing image output timing of an image processor according to an exemplary embodiment of the present invention.

FIG. 12 is a flowchart illustrating a procedure of controlling viewing image output timing of an image processor according to an exemplary embodiment of the present invention.

Referring to FIG. 12, the control unit 100 monitors arrival of a frame start/end time of the image acquired from the camera 110 and outputs the image to the image processor at step 1211. The control unit 100 monitors the frame start/end time of the image processor output, which is output from the camera, at step 1213. For example, the image processor 200 monitors the start and end times of the image output from the camera 110 and the input and processing times of the image and then, at step 1215, buffers the viewing images processed by the image processor 200 in the timing manager 170. Next, the control unit 100 outputs the viewing image stored temporarily in the timing manager 170 with the delay as long as $(\delta+\alpha)$ at step 1217. Here, $\delta$ denotes the image processing time of the image processor 200, and $\alpha$ denotes the still image processing time continued at the next frame in processing the still image. By delaying the viewing image output time as much as $(\delta+\alpha)$ at every frame, the image processor is capable of outputting the viewing images at a constant position within the frame even when processing the still image together. The control unit 100 delays the output of the viewing image as much as $(\delta+\alpha)$ by means of the timing manager 170, at step 1217, and displays the viewing image on the screen of the display unit 130 at step 1219, thereby maintaining the viewing image output timing regularly.

Figure 13:
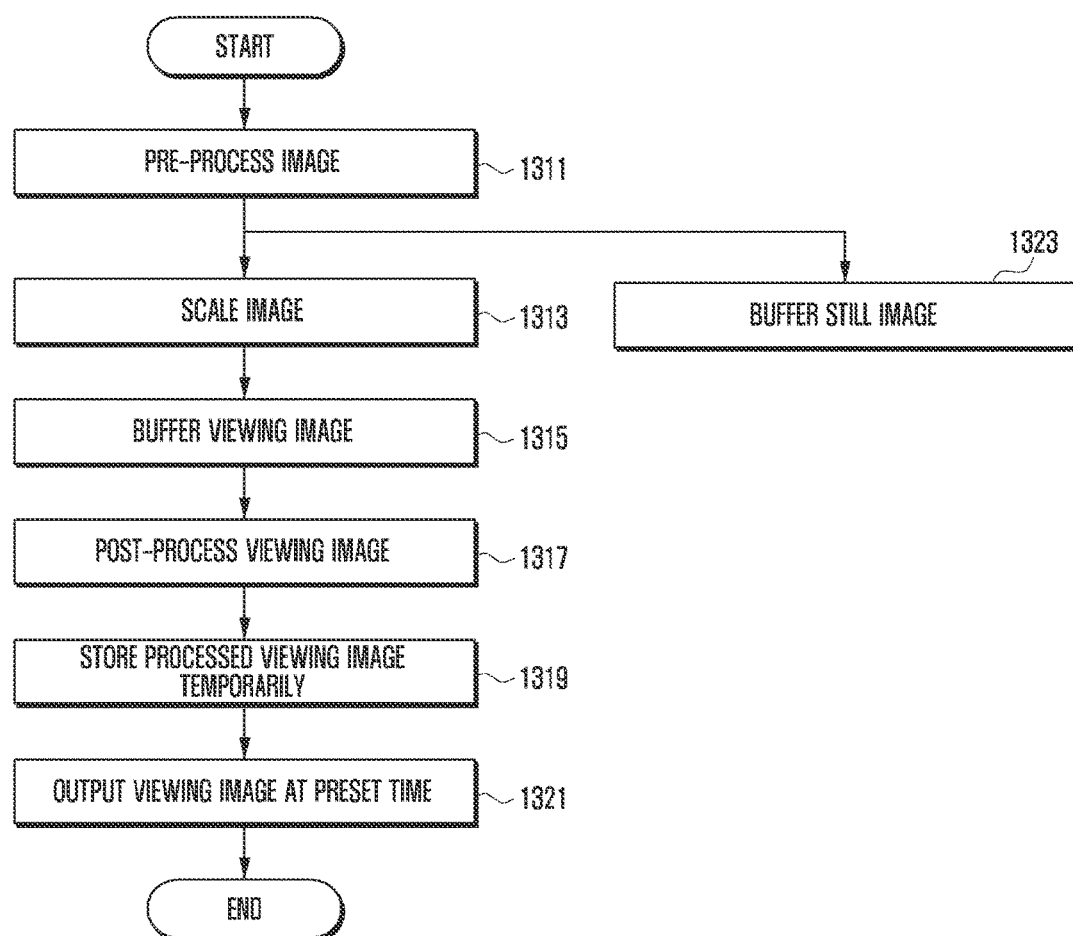
FIG. 13 is a flowchart illustrating a procedure of outputting a viewing image in processing motion image in a motion image processor according to an exemplary embodiment of the present invention.
Figure 14:
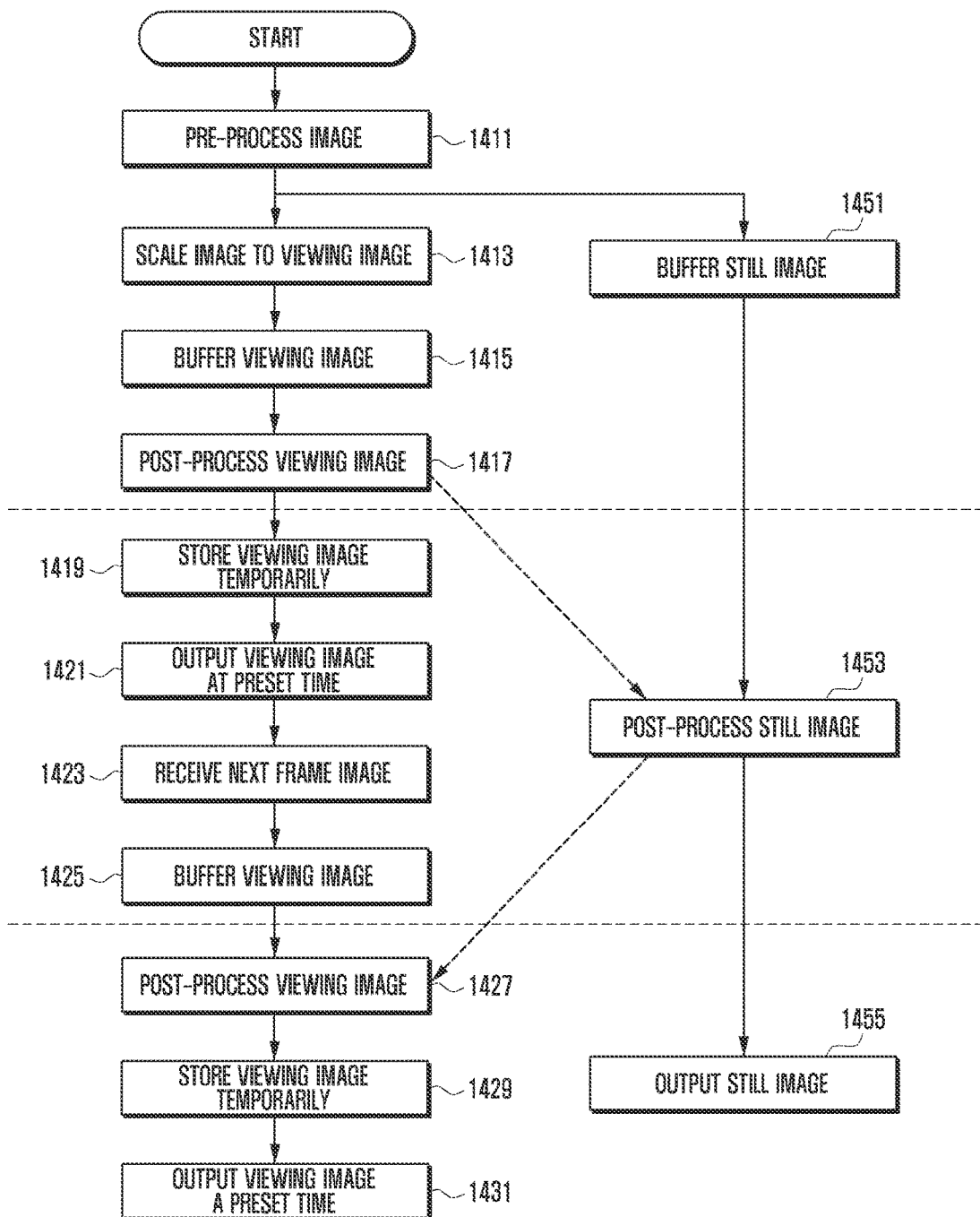
FIG. 14 is a flowchart illustrating the procedure of outputting a viewing image when an image processor processes a motion and still images in a time divisional manner according to an exemplary embodiment of the present invention.

FIG. 13 is a flowchart illustrating a procedure of outputting a viewing image in processing motion image in a motion image processor according to an exemplary embodiment of the present invention. FIG. 14 is a flowchart illustrating a procedure of outputting a viewing image when an image processor processes motion and still images in a time divisional manner according to an exemplary embodiment of the present invention. A description is made of the procedures of FIGS. 13 and 14 with reference to FIGS. 1, 2A, and 5.

Referring to FIG. 13, if the camera 110 captures and outputs an image, the pre-processor 210 of the image processor 200 receives and pre-processes the image at step 1311. Next, the image scaler 220 scales the pre-processed image to be the viewing images, as denoted by reference number 515 of FIG. 5, at step 1313. Next, the viewing image buffer 230 buffers the viewing images at step 1315. The still image buffer 250 buffers the camera's full resolution image at step 1323. The control unit 100 accesses the viewing image buffered in the viewing image buffer 230 and reads out the accessed viewing images to the post-processor 240, and the post-processor 240 post-processes the viewing images output from the viewing image buffer 230 at step 1317. In the case of the image processor 200, configured as shown in FIG. 2B, the image buffered in the viewing image buffer 230 is transferred to the pre-processor 210 and then the post-processed viewing image is transferred to the post-processor 240 so as to be post-processed. Here, the image processing time can be δ. The processed image is input to the timing manager 170 such that the timing manager 170 stores the viewing image temporarily at step 1319 and outputs the viewing image to the display unit 130 when the preset time of the frame period arrives at step 1321. Here, the preset time can be the frame end position or a position close to the frame end and can be (Δ+δ), as shown in FIG. 5, where Δ can be the value including the still image processing time in processing both the motion and still images time-divisionally. It is preferred that (Δ+δ) is configured at the frame end or a position close to the frame end.

Referring to FIG. 14, if the camera 110 takes and outputs images in the capture mode, the pre-processor 210 of the image processor 200 pre-processes the image at step 1411. Next, the image scaler 220 scales the image to generate the viewing image, as denoted by reference number 515 of part 551 in FIG. 5, at step 1413, and then, at step 1415, the viewing image buffer 230 buffers the viewing image. The still image buffer 250 buffers the camera's full resolution image at step 1451. The control unit 100 accesses the viewing image buffered in the viewing image buffer 230 and reads out the accessed viewing image to the post-processor 240, and the post processor 240 post-processes the viewing image at step 1417. Here, the image processor 200, configured as shown in FIG. 2B, transfers the image buffered in the viewing image buffer 230 to the pre-processor 210 and then transfers the pre-processed viewing image to the post-processor 240. The post-processed viewing image is input to the timing manager 170, and the timing manager 170 stores the viewing image temporarily at step 1419.

After the viewing image is stored in the timing manager 170, the control unit 100 accesses the still image with zero shutter lag in the still image buffer 250 and reads out the zero shutter lag image to the post processor 240. For example, the control unit 100 processes the images output the viewing image buffer 230 and the still image buffer 250 in a time divisional manner within the frame D period such that the still image is transferred to the post-processor 240 and the post-process of the viewing image of frame D. The post-processor 240 post-processes the still image at step 1453 and then outputs the still image at step 1455.

When post-processing the still image of frame D, if the viewing image output timing arrives while processing the still image, as denoted by reference number 553 of FIG. 5, then the control unit 100 controls the timing manager 170 to output the temporarily stored viewing image, at a preset time, to the display unit 130 at step 1421. At this time, the post-processor 240 is processing the still image continuously, as denoted by reference number 553 of FIG. 5.

If the next frame, i.e., frame E, image arrives from the camera 110 in the above state, then the pre-processor 210 receives the next frame image at step 1423, then the image scaler 220 scales the received image to the viewing image, and the viewing image buffer 230 buffers the viewing image at step 1425. Even at this time, the post-processor 240 may be processing the still image, as denoted by reference number 553 of FIG. 5.

If the post-processing of the still image has been completed, then the control unit 100 detects this and parses and transfers the output of the post-processor 240 to the still image codec 190. The control unit 100 reads out the viewing image buffered in the viewing image buffer 230 to the post-processor 240. The post-processor 240 post-processes the viewing image at step 1427 and, if the post-processing has completed, then parses and transfers the output of the post-processor 240 to the timing manager 170. The timing manager 170 stores the processed viewing image temporarily at step 1429 and, when a preset time arrives, outputs the temporarily stored viewing image to the display unit 130 at step 1431.

At this time, the preset time may occur at the same position or time within the frames D and E. For example, the preset time can be the frame end position or a position close to the frame end, and can be set to (Δ+δ), as shown in FIG. 5, where Δ can be the value including the still image processing time in processing both the motion and still images time-divisionally. It is preferred that (Δ+δ) is configured at the frame end or a position close to the frame end.

As described above, the image processor of the camera device or camera-equipped electronic device according to the present exemplary embodiments includes a high pixel camera and processes images in a time divisional manner, whereby the image processor being capable of outputting the motion viewing image at a constant time interval to the display unit while processing the still image to be stored in the motion image processing mode.

While the invention has been shown and described with reference to certain exemplary embodiments thereof, it would be understood by those skilled in the art that various changes in form and detail can be made therein without departing from the spirit and scope of the invention as defined by the appended claims and their equivalents.

What is claimed is:

1. An apparatus comprising:
   a first memory and a second memory;
   an image sensor; and
   an image processor configured to:
   obtain, using the image sensor, a plurality of images including a first image corresponding to at least one object in a first resolution,
   store the first image in the first memory in the first resolution at least temporarily,
   generate, based at least in part on the first image, a second image in a second resolution in a beginning portion of a first frame period,
   preview the second image in the second resolution via a display operatively coupled with the processor,
   receive an input in relation with the second image as previewed via the display, and
   generate, based at least in part on the first image stored in the first memory, a third image in a specific portion of a second frame period later than a beginning portion of the second frame period in response to the receiving, the generating including storing the third image in the second memory as a still image corresponding to the at least one object,
   wherein the second frame period follows the first frame period.

2. The apparatus of claim 1, wherein the image processor is further configured to set a resolution lower than the first resolution as the second resolution.

3. The apparatus of claim 1, wherein the image processor is further configured to present the third image via the display in response to the receiving.

4. The apparatus of claim 1, wherein the image processor is further configured to store the second image in the second memory based at least in part on a determination that video recording is activated with respect to the second image.

5. The apparatus of claim 1, wherein the second image is presented via the display in the second frame period.

6. The apparatus of claim 1, wherein the image processor is further configured to:
generate a fourth image corresponding to the at least one object in a third resolution based at least in part on a determination that video recording is activated with respect to the apparatus, and
store the fourth image in the second memory.

7. The apparatus of claim 1, wherein the first memory comprises at least one buffer.

8. The apparatus of claim 1, wherein the image processor comprises at least one of a signal processor, a pre-processor or a post-processor.

9. A method comprising:
obtaining, at an electronic device including an image sensor and first memory, a plurality of images including a first image corresponding to at least one object in a first resolution using the image sensor;
storing the first image in the first memory in the first resolution at least temporarily;
generating, based at least in part on the first image, a second image in a second resolution in a beginning portion of a first frame period;
presenting the second image in the second resolution via a display operatively coupled with the electronic device;
receiving an input in relation with the second image as presented via the display; and
generating, based at least in part on the first image stored in the first memory, a third image in a specific portion of a second frame period later than a beginning portion of the second frame period in response to the receiving, the generating including storing the third image in second memory operatively coupled with the electronic device as a still image corresponding to the at least one object,
wherein the second frame period follows the first frame period.

10. The method of claim 9, wherein the generating of the second image comprises setting a resolution lower than the first resolution as the second resolution.

11. The method of claim 9, wherein the generating of the third image comprises presenting the third image via the display in response to the input.

12. The method of claim 9, wherein the generating of the second image comprises storing the second image in the second memory based at least in part on a determination that video recording is activated with respect to the electronic device.

13. The method of claim 12, wherein the storing of the second image comprises encoding the second image using a specified codec.

14. The method of claim 13,
wherein the specified codec comprises an H.264 codec, and
wherein the encoding comprises compressing the second image using the H.264 codec.

15. The method of claim 9, wherein the storing of the third image comprises encoding the third image using a specified codec.

16. The method of claim 15,
wherein the specified coded comprises a joint photographic experts group (JPEG) codec, and
wherein the encoding comprises compressing the third image using the JPEG codec.

17. The method of claim 9, further comprising:
generating a fourth image corresponding to the at least one object in a third resolution based at least in part on a determination that video recording is activated with respect to the electronic device.

18. The method of claim 17, wherein the fourth image is generated in the beginning portion of the first frame period.

19. The method of claim 17, wherein the generating of the fourth image comprises setting a resolution higher than the second resolution as the third resolution.

20. A non-transitory machine-readable storage device storing instructions that, when executed by one or more processors, cause the one or more processors to perform a method comprising:
obtaining, at an electronic device including an image sensor and first memory, a plurality of images including a first image corresponding to at least one object in a first resolution using the image sensor;
storing the first image in the first memory in the first resolution at least temporarily;
generating, based at least in part on the first image, a second image in a second resolution in a beginning portion of a first frame period;
presenting the second image in the second resolution via a display operatively coupled with the electronic device;
receiving an input in relation with the second image as presented via the display; and
generating, based at least in part on the first image stored in the first memory, a third image in a specific portion of a second frame period later than a beginning portion of the second frame period in response to the receiving, the generating including storing the third image in second memory operatively coupled with the electronic device as a still image corresponding to the at least one object,
wherein the second frame period follows the first frame period.

* * * * *